US008290703B2

(12) United States Patent
Vavrus et al.

(10) Patent No.: US 8,290,703 B2
(45) Date of Patent: Oct. 16, 2012

(54) METHOD AND APPARATUS FOR ACCESS POINT RECORDING USING A POSITION DEVICE

(75) Inventors: Jon L. Vavrus, Claremont, CA (US); Brant Miller Clark, Mt. Baldy, CA (US)

(73) Assignee: Mitac International Corporation, Kuei San Hsiang, Taoyuan (TW)

( * ) Notice: Subject to any disclaimer, the term of this patent is extended or adjusted under 35 U.S.C. 154(b) by 831 days.

(21) Appl. No.: 12/016,982

(22) Filed: Jan. 18, 2008

(65) Prior Publication Data

US 2009/0187342 A1     Jul. 23, 2009

(51) Int. Cl.
*G01C 21/00*     (2006.01)
*G01C 21/34*     (2006.01)
*G08G 1/123*     (2006.01)

(52) U.S. Cl. ........ 701/434; 701/416; 701/417; 701/433; 701/445; 701/448

(58) Field of Classification Search ................. 701/200, 701/400, 408, 409, 410, 416, 417, 433, 445, 701/446, 448, 457, 466, 527
See application file for complete search history.

(56) References Cited

U.S. PATENT DOCUMENTS

| | | | |
|---|---|---|---|
| 5,515,283 A | 5/1996 | Desai et al. |
| 5,543,802 A | 8/1996 | Villevieille |
| 5,802,492 A | 9/1998 | DeLorme et al. |
| 6,047,235 A | 4/2000 | Hiyokawa |
| 6,049,755 A | 4/2000 | Lou et al. |
| 6,067,502 A | 5/2000 | Hayashida et al. |
| 6,078,864 A | 6/2000 | Long et al. |
| 6,081,609 A | 6/2000 | Narioka |
| 6,084,989 A | 7/2000 | Eppler |
| 6,092,076 A | 7/2000 | McDonough et al. |
| 6,107,944 A | 8/2000 | Behr et al. |
| 6,108,603 A | 8/2000 | Upparapalli |
| 6,108,604 A | 8/2000 | Fukaga et al. |
| 6,115,669 A | 9/2000 | Watanabe et al. |
| 6,124,826 A | 9/2000 | Garthwaite et al. |
| 6,125,326 A | 9/2000 | Ohmura et al. |
| 6,128,571 A | 10/2000 | Ito |
| 6,141,621 A | 10/2000 | Piwowarski et al. |
| 6,148,261 A | 11/2000 | Obradovich et al. |
| 6,151,552 A | 11/2000 | Koizumi et al. |
| 6,154,699 A | 11/2000 | Williams |
| 6,163,269 A | 12/2000 | Millington et al. |

(Continued)

FOREIGN PATENT DOCUMENTS

| | | | |
|---|---|---|---|
| EP | 2000770 A1 | * | 12/2008 |
| EP | 2000771 A1 | * | 12/2008 |
| JP | 2001194172 | | 7/2001 |
| JP | 2002048574 | | 2/2002 |
| JP | 2003057057 A | * | 2/2003 |

(Continued)

OTHER PUBLICATIONS

English Translation JP 3929773B2.*

(Continued)

*Primary Examiner* — Thomas Tarcza
*Assistant Examiner* — Rami Khatib
(74) *Attorney, Agent, or Firm* — Winston Hsu; Scott Margo

(57) ABSTRACT

A method and apparatus for identifying access points using a positioning device and a map having a plurality of segments; determining that the positioning device is near a first location; detecting that the positioning device is off-route at a second location; and storing the second location as a first access point associated with the first location on the map.

10 Claims, 13 Drawing Sheets

U.S. PATENT DOCUMENTS

| | | | |
|---|---|---|---|
| 6,172,641 B1 | 1/2001 | Millington | |
| 6,175,801 B1 | 1/2001 | Millington | |
| 6,177,943 B1 | 1/2001 | Margolin | |
| 6,178,380 B1 | 1/2001 | Millington | |
| 6,184,823 B1 | 2/2001 | Smith et al. | |
| 6,189,130 B1 | 2/2001 | Gofman et al. | |
| 6,201,540 B1 | 3/2001 | Gallup et al. | |
| 6,204,778 B1 | 3/2001 | Bergan et al. | |
| 6,205,397 B1 | 3/2001 | Eslambolchi et al. | |
| 6,212,472 B1* | 4/2001 | Nonaka et al. | 701/208 |
| 6,212,474 B1 | 4/2001 | Fowler et al. | |
| 6,223,118 B1 | 4/2001 | Kobayashi et al. | |
| 6,229,546 B1 | 5/2001 | Lancaster et al. | |
| 6,249,740 B1 | 6/2001 | Ito et al. | |
| 6,253,151 B1 | 6/2001 | Ohler et al. | |
| 6,256,029 B1 | 7/2001 | Millington | |
| 6,278,942 B1 | 8/2001 | McDonough | |
| 6,308,134 B1 | 10/2001 | Croyle et al. | |
| 6,320,517 B1 | 11/2001 | Yano et al. | |
| 6,321,158 B1 | 11/2001 | DeLorme et al. | |
| 6,349,257 B1 | 2/2002 | Liu et al. | |
| 6,356,210 B1 | 3/2002 | Ellis | |
| 6,360,167 B1 | 3/2002 | Millington et al. | |
| 6,362,751 B1 | 3/2002 | Upparapalli | |
| 6,363,322 B1 | 3/2002 | Millington | |
| 6,370,475 B1 | 4/2002 | Breed et al. | |
| 6,374,182 B2 | 4/2002 | Bechtolsheim | |
| 6,377,278 B1 | 4/2002 | Cutright et al. | |
| 6,381,536 B1 | 4/2002 | Satoh et al. | |
| 6,385,535 B2 | 5/2002 | Ohishi et al. | |
| 6,385,542 B1 | 5/2002 | Millington | |
| 6,397,145 B1 | 5/2002 | Millington | |
| 6,405,130 B1 | 6/2002 | Piwowarski | |
| 6,408,243 B1 | 6/2002 | Yofu | |
| 6,427,115 B1 | 7/2002 | Sekiyama | |
| 6,430,501 B1 | 8/2002 | Slominski | |
| 6,453,235 B1* | 9/2002 | Endo et al. | 701/211 |
| 6,484,089 B1 | 11/2002 | Millington | |
| 6,487,494 B2 | 11/2002 | Odinak et al. | |
| 6,515,595 B1 | 2/2003 | Obradovich et al. | |
| 6,529,822 B1 | 3/2003 | Millington et al. | |
| 6,529,824 B1 | 3/2003 | Obradovich et al. | |
| 6,539,301 B1 | 3/2003 | Shirk | |
| 6,542,814 B2 | 4/2003 | Polidi et al. | |
| 6,565,610 B1 | 5/2003 | Wang et al. | |
| 6,574,551 B1 | 6/2003 | Maxwell et al. | |
| 6,609,062 B2 | 8/2003 | Hancock | |
| 6,631,322 B1 | 10/2003 | Arthur et al. | |
| 6,636,847 B1 | 10/2003 | Spires | |
| 6,671,617 B2 | 12/2003 | Odinak et al. | |
| 6,704,649 B2 | 3/2004 | Miyahara | |
| 6,728,608 B2 | 4/2004 | Ollis et al. | |
| 6,728,636 B2 | 4/2004 | Kokijima et al. | |
| 6,748,323 B2 | 6/2004 | Lokshin et al. | |
| 6,765,554 B2 | 7/2004 | Millington | |
| 6,774,932 B1 | 8/2004 | Ewing | |
| 6,782,319 B1 | 8/2004 | McDonough | |
| 6,816,596 B1 | 11/2004 | Peinado et al. | |
| 6,819,301 B2 | 11/2004 | Nagamatsu et al. | |
| 6,842,695 B1 | 1/2005 | Tu | |
| 6,873,907 B1 | 3/2005 | Millington et al. | |
| 6,885,874 B2 | 4/2005 | Grube et al. | |
| 6,917,982 B1 | 7/2005 | Dueck et al. | |
| 6,938,028 B1 | 8/2005 | Ito | |
| 7,031,834 B2 | 4/2006 | Ito et al. | |
| 7,031,836 B2 | 4/2006 | Branch | |
| 7,058,504 B2 | 6/2006 | McDonough et al. | |
| 7,170,518 B1 | 1/2007 | Millington et al. | |
| 7,233,860 B2 | 6/2007 | Lokshin et al. | |
| 7,260,475 B2 | 8/2007 | Suzuki | |
| 7,321,826 B2 | 1/2008 | Sheha et al. | |
| 7,333,820 B2 | 2/2008 | Sheha et al. | |
| 7,343,242 B2 | 3/2008 | Breitenberger et al. | |
| 7,353,107 B2 | 4/2008 | Breitenberger et al. | |
| 7,379,812 B2 | 5/2008 | Yoshioka et al. | |
| 7,389,182 B2 | 6/2008 | Tomita | |
| 7,421,334 B2 | 9/2008 | Dahlgren | |
| 7,512,487 B1 | 3/2009 | Golding et al. | |
| 7,546,202 B2 | 6/2009 | Ohishi et al. | |
| 7,590,490 B2 | 9/2009 | Clark | |
| 7,603,231 B2* | 10/2009 | Ogawa | 701/209 |
| 7,630,830 B2* | 12/2009 | Watanabe | 701/200 |
| 2001/0018628 A1 | 8/2001 | Jenkins et al. | |
| 2002/0151315 A1 | 10/2002 | Hendrey | |
| 2003/0036842 A1 | 2/2003 | Hancock | |
| 2003/0036848 A1 | 2/2003 | Sheha et al. | |
| 2003/0167120 A1 | 9/2003 | Kawasaki | |
| 2003/0182052 A1 | 9/2003 | DeLorme et al. | |
| 2003/0191578 A1 | 10/2003 | Paulauskas et al. | |
| 2004/0193365 A1* | 9/2004 | Kokojima et al. | 701/201 |
| 2005/0102098 A1 | 5/2005 | Montealegre | |
| 2005/0107948 A1 | 5/2005 | Catalinotto | |
| 2006/0080031 A1 | 4/2006 | Cooper et al. | |
| 2006/0089788 A1 | 4/2006 | Laverty | |
| 2006/0106534 A1 | 5/2006 | Kawamata et al. | |
| 2006/0111835 A1 | 5/2006 | Baker | |
| 2006/0212217 A1 | 9/2006 | Sheha et al. | |
| 2006/0241857 A1* | 10/2006 | Onishi et al. | 701/202 |
| 2006/0265422 A1 | 11/2006 | Ando et al. | |
| 2007/0027628 A1 | 2/2007 | Geelen | |
| 2007/0069923 A1 | 3/2007 | Mendelson | |
| 2007/0073480 A1 | 3/2007 | Singh | |
| 2007/0088494 A1 | 4/2007 | Rothman et al. | |
| 2007/0130153 A1 | 6/2007 | Nachman et al. | |
| 2007/0204218 A1 | 8/2007 | Weber et al. | |
| 2007/0213929 A1 | 9/2007 | Tanizaki et al. | |
| 2007/0233384 A1 | 10/2007 | Lee et al. | |
| 2008/0027640 A1 | 1/2008 | Kashalkar | |
| 2008/0065327 A1 | 3/2008 | Sobue | |
| 2008/0076451 A1 | 3/2008 | Sheha et al. | |
| 2008/0125958 A1 | 5/2008 | Boss et al. | |
| 2008/0133120 A1 | 6/2008 | Romanick | |
| 2008/0134088 A1 | 6/2008 | Tse et al. | |
| 2008/0144884 A1 | 6/2008 | Habibi | |
| 2008/0177470 A1* | 7/2008 | Sutardja | 701/210 |
| 2008/0270016 A1 | 10/2008 | Proietty et al. | |
| 2009/0030607 A1* | 1/2009 | Sakata et al. | 701/209 |
| 2009/0138190 A1 | 5/2009 | Kulik | |
| 2009/0143979 A1* | 6/2009 | Sakata | 701/201 |
| 2009/0150064 A1 | 6/2009 | Geelen | |
| 2009/0153362 A1* | 6/2009 | Goto et al. | 340/932.2 |
| 2009/0164119 A1* | 6/2009 | Sakata | 701/209 |
| 2009/0171584 A1 | 7/2009 | Liu | |
| 2009/0182498 A1 | 7/2009 | Seymour | |
| 2009/0182500 A1 | 7/2009 | Dicke | |
| 2009/0187340 A1 | 7/2009 | Vavrus | |
| 2009/0187341 A1 | 7/2009 | Vavrus | |
| 2009/0281725 A1* | 11/2009 | Sakata | 701/208 |

FOREIGN PATENT DOCUMENTS

| | | |
|---|---|---|
| JP | 2006250875 | 9/2006 |
| JP | 3929773 B2 * | 6/2007 |
| JP | 2007155582 | 6/2007 |
| JP | 2007178182 | 7/2007 |
| JP | 2008002978 | 1/2008 |
| KR | 19990011004 | 2/1999 |
| KR | 19990040849 | 6/1999 |
| KR | 20020084716 | 11/2002 |
| KR | 20040106688 | 12/2004 |
| KR | 20070080726 | 8/2007 |
| WO | 2008070226 | 6/2008 |
| WO | 2008073717 | 6/2008 |
| WO | 2008100656 | 8/2008 |
| WO | 2008112335 | 9/2008 |
| WO | 2008130722 | 10/2008 |
| WO | 2008134093 | 11/2008 |
| WO | 2009036052 | 3/2009 |

OTHER PUBLICATIONS

English Translation JP2003057057A.*
International Patent Application No. PCT/US2008/084659, Written Opinion and International Search Report, Apr. 28, 2009.
International Patent Application No. PCT/US2009/030177, Written Opinion and International Search Report, Apr. 29, 2009.
International Patent Application No. PCT/US2009/030314, Written Opinion and International Search Report, May 25, 2009.

Shamir, Adi et al., "Playing 'Hide and Seek' with Stored Keys," Lecture Notes in Computer Science, vol. 1648, 1991, pp. 118-124.

Transaction History of related U.S. Appl. No. 08/691,663, filed Aug. 2, 1996, entitled "Method Providing a Textual Description of a Remote Vehicle Location," now U.S. Patent No. 6,141,621.

Transaction History of related U.S. Appl. No. 08/691,727, filed Aug. 2, 1996, entitled "System and Method for Controlling a Vehicle Emergency Response Network," now U.S. Patent No. 6,539,301.

Transaction History of related U.S. Appl. No. 08/710,473, filed Sep. 18, 1996, entitled "Navigation Simulator and Recorder," now U.S. Patent No. 5,922,041.

Transaction History of related U.S. Appl. No. 08/713,625, filed Sep. 13, 1996, entitled "Navigation System With Vehicle Service Information," now U.S. Patent No. 5,819,201.

Transaction History of related U.S. Appl. No. 08/713,627, filed Sep. 13, 1996, entitled "Navigation System With User Definable Cost Values," now U.S. Patent No. 5,878,368.

Transaction History of related U.S. Appl. No. 08/762,012, filed Dec. 11, 1996, entitled "Navigation System With Forward Looking Origin Selection for Route Re-Calculation," now U.S. Patent No. 6,405,130.

Transaction History of related U.S. Appl. No. 09/037,772, filed Mar. 10, 1998, entitled "Navigation System Character Input Device," now U.S. Patent No. 6,037,942.

Transaction History of relatedU.S. Appl. No. 09/056,218, filed Apr. 7, 1998, entitled "Navigation System using Position Network for Map Matching," now U.S. Patent No. 6,108,603.

Transaction History of related U.S. Appl. No. 09/062,518, filed Apr. 17, 1998, entitled "3-Dimensional Intersection Display for Vehicle Navigation System," now U.S. Patent No. 6,611,753.

Transaction History of related U.S. Appl. No. 09/096,103, filed Jun. 11, 1998, entitled "Navigation System With a Route Exclusion List System," now U.S. Patent No. 6,362,751.

Transaction History of related U.S. Appl. No. 09/099,963, filed Jun. 19, 1998, entitled "Autoscaling of Recommended Route," now U.S. Patent No. 6,574,551.

Transaction History of related U.S. Appl. No. 09/100,683, filed Jun. 19, 1998, entitled "Navigation System Map Panning Directional Indicator," now U.S. Patent No. 6,175,801.

Transaction History of related U.S. Appl. No. 09/114,670, filed Jul. 13, 1998, entitled "Navigation System Vehicle Location Display," now U.S. Patent No. 6,049,755.

Transaction History of related U.S. Appl. No. 09/118,030, filed Jul. 17, 1998, entitled "Navigation System With Predetermined Indication of Next Maneuver," now U.S. Patent No. 6,078,684.

Transaction History of related U.S. Appl. No. 09/160,068, filed Sep. 24, 1998, entitled "Navigation System With Anti-Alias Map Display," now U.S. Patent No. 6,163,269.

Transaction History of related U.S. Appl. No. 09/176,630, filed Oct. 22, 1998, entitled "Street Identification for a Map Zoom of a Navigation System," now U.S. Patent No. 6,178,380.

Transaction History of related U.S. Appl. No. 09/239,692, filed Jan. 29, 1999, entitled "Vehicle Navigation System With Location Based Multi-Media Annotation," now U.S. Patent No. 6,360,167.

Transaction History of related U.S. Appl. No. 09/418,749, filed Oct. 15, 1999, entitled "Navigation System With Road Condition Sampling," now U.S. Patent No. 6,484,089.

Transaction History of related U.S. Appl. No. 09/435,381, filed Nov. 5, 1999, entitled "Navigation System Character Input Device," now U.S. Patent No. 6,765,554.

Transaction History of related U.S. Appl. No. 09/470,438, filed Dec. 22, 1999, entitled "Navigation System With All Character Support," now U.S. Patent No. 6,256,029.

Transaction History of related U.S. Appl. No. 09/470,441, filed Dec. 22, 1999, entitled "Navigation System With Unique Audio Tones for Maneuver Notification," now U.S. Patent No. 6,363,322.

Transaction History of related U.S. Appl. No. 09/487,654, filed Jan. 19, 2000, entitled "Navigation System With Route Indicators," now U.S. Patent No. 6,430,501.

Transaction History of related U.S. Appl. No. 09/519,143, filed Mar. 6, 2000, entitled "Navigation System With Complex Maneuver Instruction," now U.S. Patent No. 6,397,145.

Transaction History of related U.S. Appl. No. 09/535,733, filed Mar. 27, 2000, entitled "Selective Rendering of Cartographic Entities for Navigation System," now U.S. Patent No. 7,170,518.

Transaction History of related U.S. Appl. No. 09/547,004, filed Apr. 11, 2000, entitled "Navigation System With Zoomed Maneuver Instruction," now U.S. Patent No. 6,529,822.

Transaction History of related U.S. Appl. No. 09/661,982, filed Sep. 18, 2000, entitled "Points of Interest for Navigation System," now U.S. Patent No. 6,374,180.

Transaction History of related U.S. Appl. No. 09/679,671, filed Oct. 5, 2000, entitled "Navigation System With Run-Time Training Instruction," now abandoned.

Transaction History of related U.S. Appl. No. 09/691,531, filed Oct. 18, 2000, entitled "Multiple Configurations for a Vehicle Navigation System," now U.S. Patent No. 6,385,542.

Transaction History of related U.S. Appl. No. 09/799,876, filed Mar. 6, 2001, entitled "Navigation System With Figure of Merit Determination," now U.S. Patent No. 6,741,928.

Transaction History of related U.S. Appl. No. 10/088,017, filed Sep. 9, 2002, entitled "Navigation System With User Interface," now U.S. Patent No. 6,873,907.

Transaction History of related U.S. Appl. No. 10/208,261, filed Jul. 31, 2002, entitled "Displaying Data," now U.S. Patent No. 6,748,323.

Transaction History of related U.S. Appl. No. 10/619,619, filed Jul. 16, 2003, entitled "Intelligent Modular Navigation Information Capability," now U.S. Patent No. 7,233,860.

Transaction History of related U.S. Appl. No. 11/327,450, filed Jan. 9, 2006, entitled "Smart Detour."

Transaction History of related U.S. Appl. No. 11/518,205, filed Sep. 11, 2006, entitled "Method and System of Securing Content and Destination of Digital Download Via the Internet."

Transaction History of related U.S. Appl. No. 11/675,817, filed Feb. 16, 2007, entitled "A Method of Generating Curved Baseline for Map Labeling."

Transaction History of related U.S. Appl. No. 11/684,301, filed Mar. 9, 2007, entitled "Method and Apparatus for Determining a Route Having an Estimated Minimum Fuel Usage for a Vehicle."

Transaction History of related U.S. Appl. No. 11/737,125, filed Apr. 18, 2007, entitled "Method and System Navigation Using GPS Velocity Vector ."

Transaction History of related U.S. Appl. No. 11/740,280, filed Apr. 25, 2007, entitled "Adjusting Spatial Operations Based on Map Density."

Transaction History of related U.S. Appl. No. 11/840,610, filed Aug. 17, 2007, entitled "Methods and Apparatus for Measuring the Effectiveness of Advertisements Presented on a Mobile Navigation Device."

Transaction History of related U.S. Appl. No. 11/844,321, filed Aug. 23, 2007, entitled "Rerouting in Vehicle Navigation Systems."

Transaction History of related U.S. Appl. No. 11/852,973, filed Sep. 10, 2007, entitled "Nearest Neighbor Geographic Search."

Transaction History of related U.S. Appl. No. 11/906,277, filed Oct. 1, 2007, entitled "Static and Dynamic Contours."

Transaction History of related U.S. Appl. No. 11/945,211, filed Nov. 26, 2007, entitled "System and Method of Providing Traffic Data to a Mobile Device."

Transaction History of related U.S. Appl. No. 11/967,889, filed Jan. 1, 2008, entitled "System and Method for Accessing a Navigation System."

Transaction History of related U.S. Appl. No. 12/013,384, filed Jan. 11, 2008, entitled "System and Method to Provide Navigational Assistance Using an Online Social Network."

Transaction History of related U.S. Appl. No. 12/016,949, filed Jan. 18, 2008, entitled "Method and Apparatus for Hybrid Routing Using Breadcrumb Paths."

Transaction History of related U.S. Appl. No. 12/016,980, filed Jan. 18, 2008, entitled "Method and Apparatus to Search for Local Parking."

Transaction History of related U.S. Appl. No. 12/188,139, filed Aug. 7, 2008, entitled "System and Method to Record a Present Trip."

Transaction History of related U.S. Appl. No. 12/192,018, filed Aug. 14, 2008, entitled "Route Navigation via a Proximity Point."

Transaction History of related U.S. Appl. No. 12/195,152, filed Aug. 20, 2008, entitled "Systems and Methods for Smart City Search."

International Patent Application Serial No. PCT/US2009/030176, Written Opinion and International Search Report, mailed Sep. 1, 2009.

USPTO Tranaction History of related U.S. Appl. No. 08/691,663, filed Aug. 2, 1996, entitled "Method Providing a Textual Description of a Remote Vehicle Location," now U.S. Patent No. 6,141,621.

USPTO Transaction History of related U.S. Appl. No. 08/691,727, filed Aug. 2, 1996, entitled "System and Method for Controlling a Vehicle Emergency Response Network," now U.S. Patent No. 6,539,301.
USPTO Transaction History of related U.S. Appl. No. 08/710,473, filed Sep. 18, 1996, entitled "Navigation Simulator and Recorder," now U.S. Patent No. 5,922,041.
USPTO Transaction History of relatedd U.S. Appl. No. 08/713,625, filed Sep. 13, 1996, entitled "Navigation System With Vehicle Service Information," now U.S. Patent No. 5,819,201.
USPTO Transaction History of related U.S. Appl. No. 08/713,627, filed Sep. 13, 1996, entitled "Navigation System With User Definable Cost Values," now U.S. Patent No. 5,878,368.
USPTO Transaction History of related U.S. Appl. No. 08/762,012, filed Dec. 11, 1996, entitled "Navigation System With Forward Looking Origin Selection for Route Re-Calculation," now U.S. Patent No. 6,405,130.
USPTO Transaction History of related U.S. Appl. No. 09/037,772, filed Mar. 10, 1998, entitled "Navigation System Character Input Device," now U.S. Patent No. 6,037,942.
USPTO Transaction History of related U.S. Appl. No. 09/056,218, filed Apr. 7, 1998, entitled "Navigation System using Position Network for Map Matching," now U.S. Patent No. 6,108,603.
USPTO Transaction History of related U.S. Appl. No. 09/062,518, filed Apr. 17, 1998, entitled "3-Dimensional Intersection Display for Vehicle Navigation System," now U.S. Patent No. 6,611,753.
USPTO Transaction History of related U.S. Appl. No. 09/096,103, filed Jun. 11, 1998, entitled "Navigation System With a Route Exclusion List System," now U.S. Patent No. 6,362,751.
USPTO Transaction History of related U.S. Appl. No. 09/099,963, filed Jun. 19, 1998, entitled "Autoscaling of Recommended Route," now U.S. Patent No. 6,574,551.
USPTO Transaction History of related U.S. Appl. No. 09/100,683, filed Jun. 19, 1998, entitled "Navigation System Map Panning Directional Indicator," now U.S. Patent No. 6,175,801.
USPTO Transaction History of related U.S. Appl. No. 09/114,670, filed Jul. 13, 1998, entitled "Navigation System Vehicle Location Display," now U.S. Patent No. 6,049,755.
USPTO Transaction History of related U.S. Appl. No. 09/118,030, filed Jul. 17, 1998, entitled "Navigation System With Predetermined Indication of Next Maneuver," now U.S. Patent No. 6,078,684.
USPTO Transaction History of related U.S. Appl. No. 09/160,068, filed Sep. 24, 1998, entitled "Navigation System With Anti-Alias Map Display," now U.S. Patent No. 6,163,269.
USPTO Transaction History of related U.S. Appl. No. 09/176,630, filed Oct. 22, 1998, entitled "Street Identification for a Map Zoom of a Navigation System," now U.S. Patent No. 6,178,380.
USPTO Transaction History of related U.S. Appl. No. 09/239,692, filed Jan. 29, 1999, entitled "Vehicle Navigation System With Location Based Multi-Media Annotation," now U.S. Patent No. 6,360,167.
USPTO Transaction History of related U.S. Appl. No. 09/418,749, filed Oct. 15, 1999, entitled "Navigation System With Road Condition Sampling," now U.S. Patent No. 6,484,089.
USPTO Transaction History of related U.S. Appl. No. 09/435,381, filed Nov. 5, 1999, entitled "Navigation System Character Input Device," now U.S. Patent No. 6,765,554.
USPTO Transaction History of related U.S. Appl. No. 09/470,438, filed Dec. 22, 1999, entitled "Navigation System With All Character Support," now U.S. Patent No. 6,256,029.
USPTO Transaction History of related U.S. Appl. No. 09/470,441, filed Dec. 22, 1999, entitled "Navigation System With Unique Audio Tones for Maneuver Notification," now U.S. Patent No. 6,363,322.
USPTO Transaction History of related U.S. Appl. No. 09/487,654, filed Jan. 19, 2000, entitled "Navigation System With Route Indicators," now U.S. Patent No. 6,430,501.
USPTO Transaction History of related U.S. Appl. No. 09/519,143, filed Mar. 6, 2000, entitled "Navigation System With Complex Maneuver Instruction," now U.S. Patent No. 6,397,145.
USPTO Transaction History of related U.S. Appl. No. 09/535,733, filed Mar. 27, 2000, entitled "Selective Rendering of Cartographic Entities for Navigation System," now U.S. Patent No. 7,170,518.
USPTO Transaction History of related U.S. Appl. No. 09/547,004, filed Apr. 11, 2000, entitled "Navigation System With Zoomed Maneuver Instruction," now U.S. Patent No. 6,529,822.
USPTO Transaction History of related U.S. Appl. No. 09/661,982, filed Sep. 18, 2000, entitled "Points of Interest for Navigation System," now U.S. Patent No. 6,374,180.
USPTO Transaction History of related U.S. Appl. No. 09/679,671, filed Oct. 5, 2000, entitled "Navigation System With Run-Time Training Instruction," now abandoned.
USPTO Transaction History of related U.S. Appl. No. 09/691,531, filed Oct. 18, 2000, entitled "Multiple Configurations for a Vehicle Navigation System," now U.S. Patent No. 6,385,542.
USPTO Transaction History of related U.S. Appl. No. 09/799,876, filed Mar. 6, 2001, entitled "Navigation System With Figure of Merit Determination," now U.S. Patent No. 6,741,928.
USPTO Transaction History of related U.S. Appl. No. 10/088,017, filed Sep. 9, 2002, entitled "Navigation System With User Interface," now U.S. Patent No. 6,873,907.
USPTO Transaction History of related U.S. Appl. No. 10/208,261, filed Jul. 31, 2002, entitled "Displaying Data," now U.S. Patent No. 6,748,323.
USPTO Transaction History of related U.S. Appl. No. 10/619,619, filed Jul. 16, 2003, entitled "Intelligent Modular Navigation Information Capability," now U.S. Patent No. 7,233,860.
USPTO Transaction History of related U.S. Appl. No. 11/327,450, filed Jan. 9, 2006, entitled "Smart Detour."
USPTO Transaction History of related U.S. Appl. No. 11/518,205, filed Sep. 11, 2006, entitled "Method and System of Securing Content and Destination of Digital Download Via the Internet."
USPTO Transaction History of related U.S. Appl. No. 11/675,817, filed Feb. 16, 2007, entitled "A Method of Generating Curved Baseline for Map Labeling."
USPTO Transaction History of related U.S. Appl. No. 11/684,301, filed Mar. 9, 2007, entitled "Method and Apparatus for Determining a Route Having an Estimated Minimum Fuel Usage for a Vehicle."
USPTO Transaction History of related U.S. Appl. No. 11/737,125, filed Apr. 18, 2007, entitled "Method and System Navigation Using GPS Velocity Vector."
USPTO Transaction History of related U.S. Appl. No. 11/740,280, filed Apr. 25, 2007, entitled "Adjusting Spatial Operations Based on Map Density."
USPTO Transaction History of related U.S. Appl. No. 11/840,610, filed Aug. 17, 2007, entitled "Methods and Apparatus for Measuring the Effectiveness of Advertisements Presented on a Mobile Navigation Device."
USPTO Transaction History of related U.S. Appl. No. 11/844,321, filed Aug. 23, 2007, entitled "Rerouting in Vehicle Navigation Systems."
USPTO Transaction History of related U.S. Appl. No. 11/852,973, filed Sep. 10, 2007, entitled "Nearest Neighbor Geographic Search."
USPTO Transaction History of related U.S. Appl. No. 11/906,277, filed Oct. 1, 2007, entitled "Static and Dynamic Contours."
USPTO Transaction History of related U.S. Appl. No. 11/945,211, filed Nov. 26, 2007, entitled "System and Method of Providing Traffic Data to a Mobile Device."
USPTO Transaction History of related U.S. Appl. No. 11/967,889, filed Jan. 1, 2008, entitled "System and Method for Accessing a Navigation System."
USPTO Transaction History of related U.S. Appl. No. 12/013,384, filed Jan. 11, 2008, entitled "System and Method to Provide Navigational Assistance Using an Online Social Network."
USPTO Transaction History of related U.S. Appl. No. 12/016,949, filed Jan. 18, 2008, entitled "Method and Apparatus for Hybrid Routing Using Breadcrumb Paths."
USPTO Transaction History of related U.S. Appl. No. 12/016,980, filed Jan. 18, 2008, entitled "Method and Apparatus to Search for Local Parking."
USPTO Transaction History of related U.S. Appl. No. 12/188,139, filed Aug. 7, 2008, entitled "System and Method to Record a Present Trip."
USPTO Transaction History of related U.S. Appl. No. 12/192,018, filed Aug. 14, 2008, entitled "Route Navigation via a Proximity Point."
USPTO Transaction History of related U.S. Appl. No. 12/195,152, filed Aug. 20, 2008, entitled "Systems and Methods for Smart City Search."
GPS Utility-Features and Function List; GPS Utility Ltd. website (http://www.gpsu.co.uk/) Copyright 1999-2010.

* cited by examiner

US 8,290,703 B2

METHOD AND APPARATUS FOR ACCESS POINT RECORDING USING A POSITION DEVICE

BACKGROUND

1. Field of the Invention

This invention relates generally to the field of a positioning devices. More particularly, the invention relates to a method and apparatus for mapping and routing using a positioning device.

2. Description of the Related Art

Positioning devices, such as global positioning systems, are used in a variety of applications. Positioning device can be used to generate point-to-point routes from a current location to a selected destination on a digital map and provide real-time directions to get to the selected destination.

SUMMARY

A method and apparatus for identifying access points using a positioning device and a map having a plurality of segments; determining that the positioning device is near a first location; detecting that the positioning device is off-route at a second location; and storing the second location as a first access point associated with the first location on the map.

BRIEF DESCRIPTION OF THE DRAWINGS

These and other features, aspects, and advantages of the present invention will become better understood with regard to the following description, appended claims, and accompanying drawings where:

DETAILED DESCRIPTION OF PREFERRED EMBODIMENTS

Figure 1:
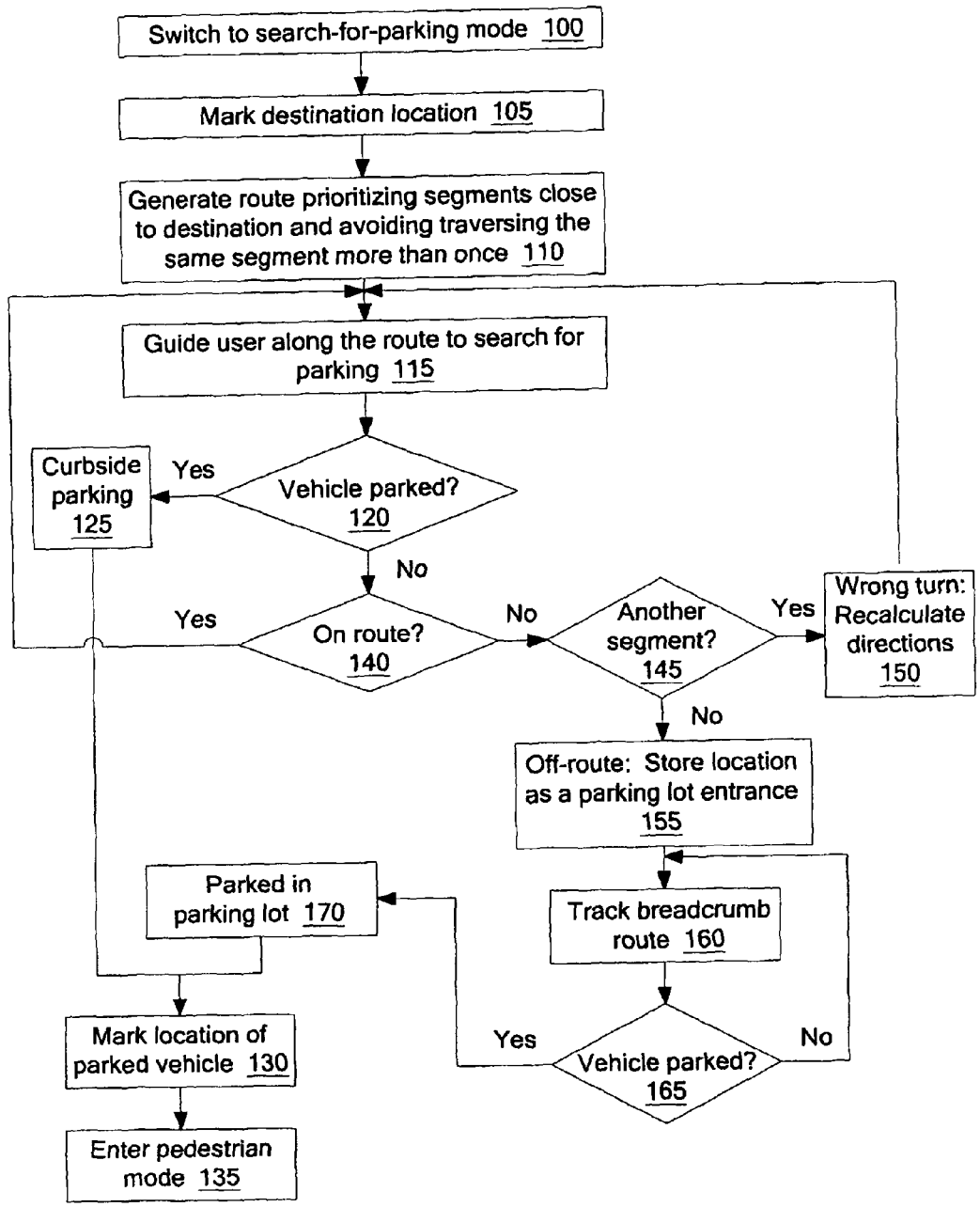
FIG. 1 is a flow chart illustrating a method of searching for parking according to one embodiment of the invention.

At least some embodiments of the disclosure relate to a method and system for routing using a positioning device.

The following description and drawings are illustrative and are not to be construed as limiting. Numerous specific details are described to provide a thorough understanding of the disclosure. However, in certain instances, well known or conventional details are not described in order to avoid obscuring the description. References to one or an embodiment in the present disclosure can be, but not necessarily are, references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Positioning devices can determine the location of the positioning device using various methods and apparatus, such as global positioning systems (GPS), long-range navigation (LORAN) systems, and triangulation methods using cell phone base station transmissions or Wi-Fi (IEEE 802.11) transmissions from known locations.

In some embodiments, a digital map can include a network of segments representing paths that can be taken to get from one location to another. The map can include information such as associations between street addresses and locations so that a user can specify a location by street address. The map can also contain locations of point of interests such as parks, airports, and landmarks so that a user can specify a location on the map by point of interest. Furthermore, a map may contain other information such as locations of restaurants, entertainment venues, gas stations as well as related information so that a user may select one of these venues on the map by selecting one of the venues that meets the venue classification and/or other criteria such as restaurant cuisine or entertainment type desired. "Segment" is used herein in some instances to describe a physical path that a vehicle or person can traverse, the physical path as represented in a map, or both.

A positioning device using a map can perform useful mapping and routing functions. A positioning device can determine the location on the map of a pedestrian carrying the positioning device or the location of a vehicle carrying the positioning device. The positioning device can use a map to route a user from the current location to a destination point on the map selected by street address, point of interest, or a criteria-based selection method, for example.

The positioning device can generate a "best" route from a starting point to a destination point on the map. Each segment may have an associated length which is used by the routing system determine the combination of segments (route) on the map with the shortest distance between the two points. Each segment may also have an associated travel time which can be used to determine the route with the shortest projected travel time between the two points. Other criteria and methods for selecting a best route may be used. In some cases, the "best" route selected may not actually be better than all other routes. For example, limitations in the selection algorithm, computation time allocated to the route selection process, errors in the associated segment lengths and projected travel times, and differing user-preferences, may cause less than optimal routes to be selected. In some cases, the "best" route selected is a satisfactory route to the selected destination that is significantly inferior to alternative routes based on the selected criteria. In some embodiments, a "good enough" route is used instead of a "best" route.

FIG. 1 illustrates a flow chart of a search-for-parking method according to one embodiment of the present invention.

In process 100, a search for parking mode is initiated. A search-for-parking mode may be initiated automatically when the positioning device detects that the vehicle moves past the destination location of a route generated using point-to-point routing, for example. When the user drives past the destination, it is assumed they are now looking for a nearby parking spot. Search-for-parking mode may also be user-initiated by a voice-activated command or touch-screen input, for example.

In process 105, a destination location is selected. The destination location may be selected as part of a point-to-point routing process. For example, a route may be generated from a current location to a destination location and a search-for-parking process may be automatically initiated as the driver approaches or drives past the destination location. Alternatively, a destination location may be identified when the user is at a location they would like to visit and wants to look for parking in the vicinity of that location. For example, the user may drive past a destination and see that there are no parking spots within their immediate view and initiate the search-for-parking process indicating that the current location of the vehicle should be selected as the destination location. In some embodiments, the destination location is a reference point used in the search-for-parking process. For example, the search-for-parking route is generated to find a parking spot near the destination location and the destination location is used to route a user back to the destination after they have parked the vehicle.

In process 110, a search-for-parking route is generated by prioritizing the segments in the map that are close to the destination location and avoiding traversing the same segments more than once. In some embodiments, "close" can be defined by the user, predetermined by design or determined based on conditions. The distance from a segment to the destination may be calculated in many ways, such as by computing the distance from the midpoint of the segment to the destination. In some cases, a previously traversed segment without any available parking spots is less likely to have an available parking spot during a second pass than a segment that has not yet been traversed.

Some examples of routes that can be used that are generally consistent with the search-for-parking priorities disclosed herein are a spiral route, a zig-zag route and a grid route. The route patterns are discussed in further detail herein. The search-for-parking priorities are affected by the routing rules and the map information. For example, segments in the map may not follow regular patterns and limit the ability to route according to idealized versions of the exemplary patterns mentioned above. Furthermore, routing limitations like one-way streets and turning restrictions may also limit routing according to the idealized patterns. In some search-for-parking routes, segments further from the destination are traversed before segments that are closer to the destination and the same segment is traversed more than once in order to balance the search-for-parking priorities with other routing rules and priorities. As a result of practical limitations, routes may be generated according to less idealized patterns but still within the spirit and scope of the present invention.

In some cases, the search-for-parking route is an open-ended route that is extended as the user approaches the end of the search-for-parking route. In other cases, the search for parking route is generated up to a predetermined distance from the destination and the search-for-parking process is restarted automatically if the vehicle arrives at the end of the search-for a-parking route.

In one embodiment, restarting the search-for-parking process results in generating and following a restart route directly back to the destination and restarting the search-for-parking route from the beginning. In some cases, another search-for-parking route is generated for the second or subsequent restarts of the search-for-parking process. For example, segments not traversed in the previous search-for-parking route may be prioritized for subsequent search-for-parking routes.

In process 115, the user is guided along the search-for-parking route. The user may be guided using speech synthesized voice announcements, a visual display, audio tones, and/or other methods of communicating directions along the search-for-parking route. A driver is told when to make turns, enter or exit highways, and given other real-time directions to guide a driver to keep the vehicle on the search-for-parking route.

In process 120, it is determined when the vehicle is parked.

In one embodiment, the positioning device determines the vehicle is parked when the vehicle engine is shut off. A wired or wireless connection between circuitry monitoring the status of the engine and the positioning device may be used to communicate the status of the engine to the positioning device.

In one embodiment, the positioning device sits in a cradle in the vehicle. The cradle may include connections to receive information as to whether the vehicle engine is on or off and otherwise transmit and receive information between the positioning device and the vehicle. In some cases, the removable positioning device interfaces through the cradle with a fixed positioning device embedded in the vehicle dashboard, for example. The removable positioning device is configured to perform pedestrian routing and the fixed positioning device is configured to perform vehicle routing. In one embodiment, the removable positioning device transmits information to the fixed positioning device when the removable positioning device is returned to the cradle. The information may include the location of alternate entrances, breadcrumb routes and parking lots identified since the removable positioning device was last removed from the cradle. In another embodiment, the removable positioning device automatically transmits the information to the fixed positioning device using wireless transmission methods when the removable positioning device is within range to wirelessly transmit to the fixed positioning device. Other methods of periodically synchronizing the information between the two positioning devices may be used.

In another embodiment, the positioning device may automatically determine that the vehicle is parked when the positioning device is removed from the cradle in the vehicle. For example, the user may remove the positioning device from the cradle to take with them and use in a pedestrian mode after leaving the parked vehicle.

In yet another embodiment, the user may indicate that the vehicle is parked. For example, the user may press a touch-screen input that indicates the vehicle is parked or speak one or more words recognized by a voice recognition system to indicate that the vehicle is parked. In some cases, this input is received directly by the positioning device. In other cases, the input is received by a device external to the positioning device and communicated to the positioning device through a wired or wireless connection.

If the vehicle is parked, process 125 is performed. If the vehicle is not parked, process 140 is performed.

In process 125, the positioning device determines that the vehicle is parked on the curbside or otherwise along the side of the search-for-parking route since the vehicle was on the search-for-parking route when the positioning device determined that the vehicle was parked.

In process 130, the positioning device marks the location of the parked vehicle. In one embodiment, the location of the parked vehicle is used to route a user back to the parked vehicle at a later time.

In process 135, the positioning device enters pedestrian mode. In some cases, the positioning device enters pedestrian mode automatically when the positioning device determines that the vehicle is parked according to the methods described with reference to process 120. For example, the positioning device may automatically enter pedestrian mode when removed from the cradle in the vehicle. Similarly, the positioning device may automatically enter vehicle mode when placed in the cradle in the vehicle.

In one embodiment, the positioning device in pedestrian mode is configured to behave differently than the positioning device in vehicle mode. For example, certain segments in the map may only be available for routing in pedestrian mode (they are not traversable by vehicle) and other segments may only be available for routing in vehicle mode (they are not traversable by pedestrians). The method is completed.

In process 140, it is determined whether the vehicle is on the search-for-parking route. If the vehicle is on the search-for-parking route, process 115 is performed. If the vehicle is not on the search-for-parking route, process 145 is performed.

In process 145, it is determined whether the vehicle is on another segment in the map that is not on the search-for-parking route. If the vehicle is on another segment in the map, process 150 is performed. If the vehicle is not on another segment on the map, process 155 is performed.

In process 150, the vehicle is on another segment of the map that diverges from the search-for-parking route. The positioning device assumes that a wrong turn was made and makes an announcement notifying the user. In one embodiment, the positioning device generates a new search-for-parking route from the current location according to the search-for-parking priorities described herein with the same destination point as the reference point. Process 115 is performed.

In process 155, the vehicle is not on another segment of the map. The positioning device is considered "off-map" because it is not located on a segment of the map. When the vehicle goes off-route in search-for-parking mode, the positioning device assumes that the vehicle has turned into the entrance of a parking lot. The positioning device stores the current location as the location of an entrance to the parking lot. The actual entrance of the parking lot may be some distance from the location at which the positioning device determined that the vehicle was "off-route" but this location is sufficiently close for the purposes of routing to and from the entrance of the parking lot.

In process 160, the positioning device periodically determines the location of the positioning device and plots the sequence of points on the map. A sequence of points generated in this way is known as a breadcrumb route. This breadcrumb route tracks the path taken by the vehicle in the parking lot. The breadcrumb route is stored in the positioning device.

In process 165, it is determined when the vehicle is parked.

In one embodiment, the positioning device determines the vehicle is parked when the vehicle engine is shut off. In another embodiment, the positioning device may automatically determine that the vehicle is parked when the positioning device is removed from a cradle in the vehicle. For example, the user may remove the positioning device from the cradle to take with them and use in a pedestrian mode after leaving the parked vehicle. In yet another embodiment, the user may indicate that the vehicle is parked.

If the vehicle is parked, process 170 is performed. If the vehicle is not parked, process 160 is performed.

In process 170, the positioning device determines that the vehicle is parked in the parking lot since the vehicle went off-route into a parking lot at process 155. Process 130 is performed.

Figure 2:
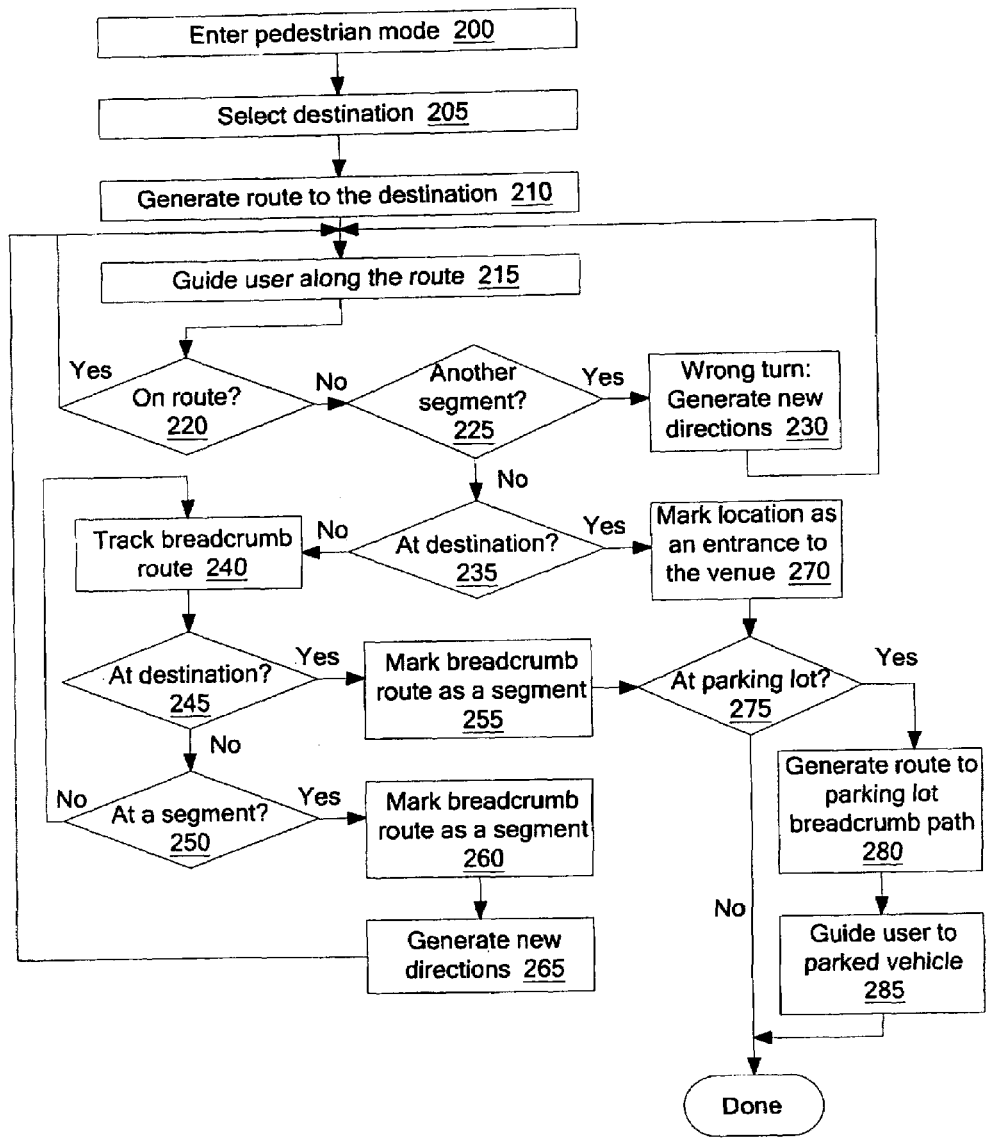
FIG. 2 is a flow chart illustrating a method of pedestrian routing according to one embodiment of the invention.

FIG. 2 illustrates a flow chart of a pedestrian routing method according to one embodiment of the present invention.

In process 200, the positioning device enters pedestrian mode. The positioning device may automatically enter pedestrian mode when removed from a cradle in the vehicle. Pedestrian mode may also be user-initiated by a voice-activated command or touch-screen input, for example. In some embodiments, the positioning device always operates in a mode for pedestrian routing. In other cases, instructions and/or data is downloaded by a portable positioning device from the positioning device in the vehicle so that the portable positioning device may be used according to the method described in this flow chart. Process 205 is performed.

In process 205, a destination is selected. The destination may be the destination referenced in the search-for-parking process. In one embodiment, the user completes the search-for-parking process of FIG. 1 and requests the positioning device to generate a route to walk from the parked car to the destination. In one embodiment, the route from the parked car to the destination is automatically generated when the user removes the positioning device from the cradle of the parked vehicle.

Alternatively, another destination is selected by specifying a street address, a point-of-interest or a location by other selection means.

In process 210, a pedestrian route is generated to the destination. In one embodiment, the pedestrian route includes a breadcrumb route generated from the entrance of the parking lot along the path the vehicle took to the point at which the vehicle is parked. The user is expected to follow that breadcrumb route back to the entrance of the parking lot. At that point, the user is at or near a segment of the map because that is where the vehicle went off-route. Point-to-point routing is used from the access point of the parking lot to the destination selected in the process 205.

In process 215, the user is guided along the pedestrian route using speech synthesized voice announcements, a visual display, audio tones, and/or other methods of communicating directions along the search-for-parking route. The user may be told when to make turns and given other real-time directions to keep them on the pedestrian route. In other embodiments, the user is guided using the pedestrian route illustrated in a map display or guided using text directions.

In process 220, it is determined whether the user is on the pedestrian route. If the user is on the pedestrian route, process 215 is performed. If the user is not on the pedestrian route, process 225 is performed.

In process 225, it is determined whether the user is on another segment of the map. If the user is on another segment of the map, process 230 is performed. If the user is not on another segment of the map, process 235 is performed.

In process 230, the vehicle is on another segment of the map that diverges from the pedestrian route. The positioning device determines that a wrong turn was made and makes an announcement notifying the user. In one embodiment, the positioning device generates a new pedestrian route from the current location. In some embodiments, the positioning device may wait for a given time period or for a given distance of divergence from the pedestrian path, before generating a new pedestrian route. This gives the user an opportunity to correct course back to the pedestrian route if the divergence was unintended. Process 215 is performed.

In process 235, it is determined whether the user is at the destination. The user has diverged from the pedestrian route but is not on another segment of the map. The user is considered "off-map" because the user is not located on a segment of the map. If the user is at the destination, process 270 is performed. If the user is not at the destination, process 240 is performed.

In process 240, the positioning device determines that the user is taking a shortcut that is not represented as a segment in the map. A breadcrumb route is stored until the user arrives at another segment or at the destination.

In process 245, the positioning device determines that the user is at the destination. In such a case, the breadcrumb route is a route from the location at which the user went off-route to the location of the destination. Process 255 is performed.

In process 250, the positioning device determines that the user is at another segment of the map. In such a case, the breadcrumb route is a route from the location at which the user went off-route to the segment of the current location of the user. Process 260 is performed.

In process 255, the breadcrumb route is stored as a new segment ending at an entrance to the venue. The new segment runs from the location that the user went off-route to the destination. In one embodiment, this new segment is made available for generation of all routes. In another embodiment, this new segment is available only to generate routes in pedestrian mode. In yet another embodiment, this new segment is made available to generate routes in modes as specified by the user. For example, when the breadcrumb route is stored as a segment, the user may be prompted to indicate whether this new segment should also be made available for vehicle mode. Process 275 is performed.

In process 260, the breadcrumb route is stored as a new segment running from the location that the positioning device went off-route to the location that the positioning device arrived at a segment of the map. The positioning device stores the segment. In one embodiment, this new segment is made available for generation of all routes. In another embodiment, this new segment is available only to generate routes in pedestrian mode. In yet another embodiment, this new segment is made available to generate routes in modes as specified by the user. For example, when the breadcrumb route is stored as a segment, the user may be prompted to indicate whether this new segment should also be made available for vehicle mode.

In process 265, new directions are generated using point-to-point routing from the point at which the positioning device returns to a segment of the map to the destination. Process 215 is performed.

In process 270, the location is stored as an entrance to the venue. When the user goes off-route in pedestrian mode, the positioning device determines that the user has turned into an alternative entrance to a venue. The positioning device stores the current location as the location of an entrance to the venue. The actual entrance of the venue may be some distance from the location at which positioning device determined that the user was "off-route" but this location is sufficiently close for the purposes of routing to and from the entrance of the venue.

In process 275, the positioning device determines whether it is at the parking lot where the vehicle was parked. If the positioning device is at that parking lot, process 280 is performed. If the positioning device is not at that parking lot, the method is completed.

In process 280, a route is generated to the parked vehicle through the parking lot using the previously stored breadcrumb path. In one embodiment, the parking lot breadcrumb path is generated in process 160 shown in FIG. 1. The parking lot breadcrumb path represents the path the vehicle took from a parking lot entrance to the location that the vehicle is parked. In one embodiment, the route is generated from the parking lot entrance to the closest point on the parking lot breadcrumb path. The user uses the route to get to the parking lot breadcrumb path and then takes the portion of the parking lot breadcrumb path that leads to the parked vehicle. In another embodiment, the user is at the same parking lot entrance at which the parking lot breadcrumb path begins, no route is generated and the parking lot breadcrumb path is used in its entirety.

In process 285, the user is guided to the parked vehicle using speech synthesized voice announcements, a visual display, audio tones, and/or other methods of communicating directions along the search-for-parking route. The user may be told when to make turns and given other real-time directions to keep them on the pedestrian route. In other embodiments, the user is guided using the pedestrian route illustrated in a map display or guided using text directions. The method is completed.

Figure 3:
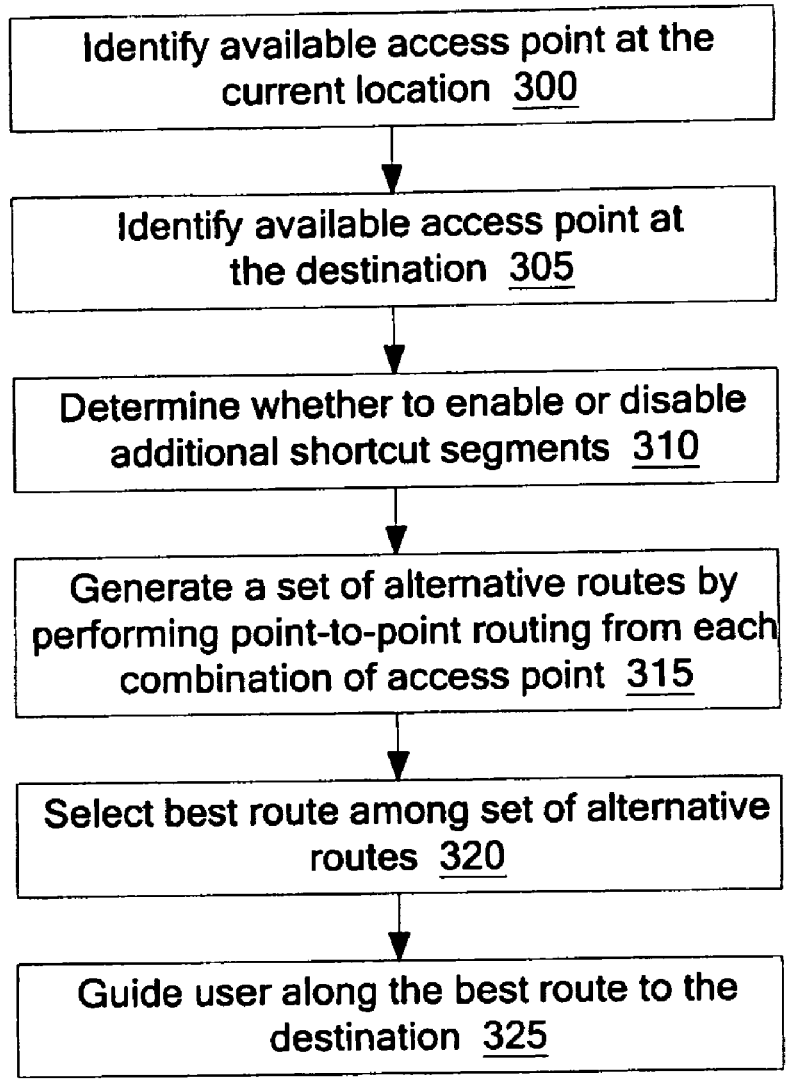
FIG. 3 is a flow chart illustrating a method of routing using alternative access points to venues according to one embodiment of the invention.

FIG. 3 illustrates a flow chart of a routing method according to one embodiment of the present invention.

In process 300, the positioning device identifies access points at the current location of the positioning device. In some cases, the venue only has an access point corresponding to the main entrance associated with the address of the venue, for example. In other cases, one or more additional access points have been stored for this venue according to the methods described herein. In yet other cases, the current location is on a segment of the map and this location is the used as the only starting location. Process 305 is performed.

In process 305, the positioning device identifies access points at the destination location. In some cases, the destination only has an access point corresponding to the main entrance associated with the address of the destination, for example. In other cases, one or more additional access points have been stored for the destination according to the methods described herein. In yet other cases, the destination is on a segment of the map and this location is the used as the only destination location. Process 310 is performed.

In some cases, some access points may be stored as an entrance, exit, or both. In such cases, only exits are used at the current location and only entrances are used at the destination.

In process 310, the positioning device determines whether to enable or disable additional shortcut segments for routing. Shortcut segments are breadcrumb routes stored according to methods described herein. In one embodiment, the shortcut segments are made available for generation of all routes. In another embodiment, the shortcut segments are available only to generate routes in pedestrian mode. In yet another embodiment, shortcut segments are made available to generate routes in modes as specified by the user. For example, when a breadcrumb route is stored as a shortcut segment, the user may be prompted to indicate whether the new shortcut segment should also be made available for vehicle mode. Process 315 is performed.

In process 315, a set of alternative routes are generated between the current location and the destination using all combinations of access points for each location with or without the shortcut segments, depending on whether shortcut segments are enabled. For example, if the current location has two access points and the destination has two access points, four alternative routes would be generated: (1) a route from the first access point of the current location to the first access point of the destination; (2) a route from the first access point of the current location to the second access point of the destination; (3) a route from the second access point of the current location to the first access point of the destination; and (4) a route from the second access point of the current location to the second access point of the destination. Process 320 is performed.

In process 320, the best route is selected among the alternative routes. The best route may be the route with the shortest length or the shortest projected travel time, for example. In some cases, the best route is not the optimal route but one of the best routes. Process 325 is performed.

In process 325, the user is guided along the best route to the destination. The method is completed.

Figure 4:
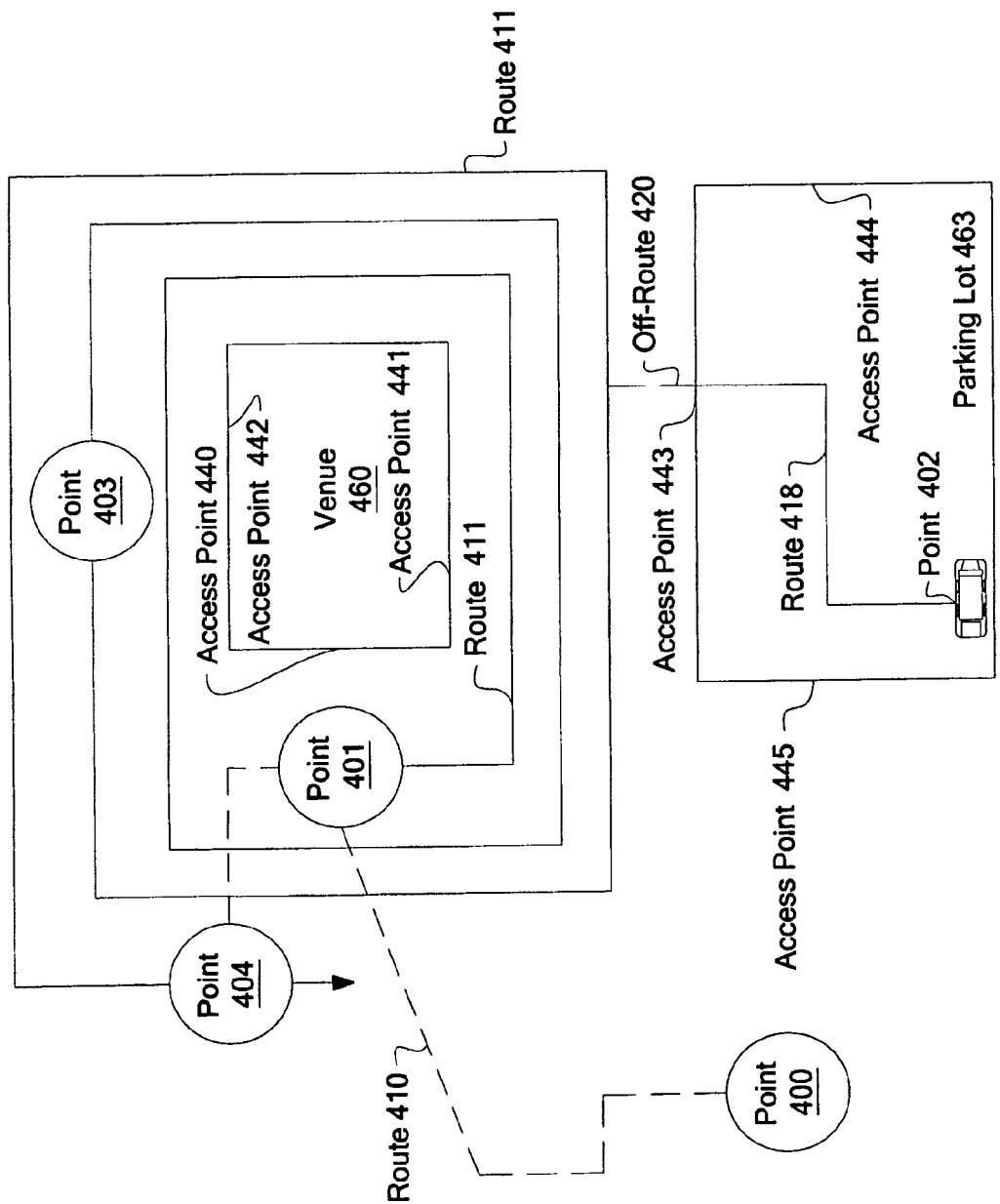
FIG. 4 is a diagrammatic representation of a map with a search for parking using a spiral pattern route according to one embodiment of the invention.

FIG. 4 illustrates a diagrammatic representation of a map with routing information according to one embodiment of the present invention.

A vehicle starts off at a point 400. In one embodiment, point-to-point routing is used to generate a route to drive the car to a selected location using the segments in the map. For example, a user enters an address of a venue 460 or otherwise specifies a destination point into a positioning device. The positioning device generates a route 410 to a point 401. The point 401 is the destination point associated in the map with the address of the venue 460. The point 401 is in the vicinity of an access point 440 of the venue 460. An access point can be an entrance, exit or both an entrance and an exit to the venue. The access point may take many forms, such as a door, a corridor, a stairway, an opening in a wall or any other means for entry or exit. The venue can be a building, shopping complex, university campus, park, parking lot or other places that have access points for entry or exit. In alternative embodiments, the point 401 is associated with a place without any access points, such as an open field.

In some embodiments, while responding to the initial routing request or after arriving at the point 401, the positioning system checks for parking lots in the vicinity of the point 401 using the map. If a parking lot is found that the user considers acceptably close to the point 401, the positioning system may be used to route to that parking lot location using point-to-point routing from the point 400 or from the point 401, for example. In some cases, the map does not include existing nearby parking lots ("unmapped parking lots"). In other cases, the only available parking spots are curbside parking spots which are not included in the map. Therefore, there may be a closer parking lot or closer parking spots not represented in the map. The user may opt to search for parking instead of being routed to the closest parking lot in the map.

In one embodiment, the user triggers a search-for-parking mode by speaking a command recognized by a voice-recognition system or pressing a button on the positioning device. In the search-for-parking mode, the positioning system generates a route starting at the current location of the vehicle at or near the point 101, for example, selecting segments on the map by prioritizing segments closer to the point 101 and avoiding use of the same segments more than once ("search-for-parking priorities"). By selecting segments with the search-for-parking priorities, the driver checks for curbside parking and unmapped parking lots in locations that are closer to the point 101 thereby attempting to minimize the walk from the parking spot to the destination. Furthermore, selecting segments with search-for-parking priorities, the user avoids checking the same locations a second time when other nearby locations have yet to be checked.

In one embodiment, a route 411 is generated to search for parking. The route 411 is in a spiral pattern around the venue 460. The route 411 generally follows the search-for-parking priorities by prioritizing the closest segments to the point 401 while avoiding traversing the same segments twice.

When the vehicle follows the route 411 the positioning device tracks the vehicle's position along segments of the route 411. When the vehicle goes onto a position of a segment that is on the map but not on the route 411, the positioning device may respond as if the user made a wrong turn and generate an announcement notifying the user of the mistake and generate a point-to-point route to get the vehicle back onto the route 411. However, the user may have intentionally left the route 411 because based on their view from the vehicle they believe that parking is more likely on the alternative path that they took. In another embodiment, the positioning device may generate a new search-for-parking route given the turn off of the route 411 since the route 411 is not for the purpose of arriving at any particular destination.

At any given time during the search-for-parking process, the user may find curbside parking. For example, the user may find parking at a point 403 on the route 411. In one embodiment, the positioning system may determine that the vehicle is parked when the vehicle engine is shut off. In another embodiment, the positioning system determines that the vehicle is parked when the positioning device is removed from a cradle in the vehicle. The user may remove the positioning device to carry with them for pedestrian mapping and routing. In some embodiments, the user may indicate that the vehicle is parked by speaking a command recognized by a voice-recognition system or pressing a button on the positioning device. When the positioning device determines that the vehicle is parked, it stores that location for future reference. The user can then take the positioning device with them when they leave the vehicle and request routing directions back to the parked vehicle at a later time.

Alternatively, the user may find a parking lot while driving along the route 411. In one embodiment, when the vehicle goes onto a location that is not represented by a segment on the map while the positioning device is in a search-for-parking process, the positioning device determines that this location is an access point to a parking lot. For example, a vehicle on the route 411 turns onto an off-route 420 and in response the positioning device marks an access point 443 to a parking lot 463.

The first lot access point 443 can be stored in the map to be used for future routing requests. For example, after the access point 443 is stored in the map, the positioning device can be configured to return this location as a parking option when local parking lots are requested. Furthermore, point-to-point routing can be performed to the access point 443. For example, the next time the user is at the point 400 and is interested in going to the venue 460, point-to-point routing from the point 400 to the access point 443 can be performed, routing the vehicle (or pedestrian) directly to the nearby parking lot. Alternatively, the next time the user is at the point 401, point-to-point routing from the point 401 to the access point 443 can be performed, routing the vehicle directly to the nearby parking lot.

In some cases, the access point may only be an entrance to the parking lot or it may be both an entrance and an exit to the parking lot. In some embodiments, user input is requested to classify this access point as an entrance only, an exit only, or both and entrance and exit and this information is used for future routing requests. For example, when point-to-point routing is performed to the parking lot 463, the positioning device prioritizes access points classified as entrances to the parking lot 463. When point-to-point routing is performed starting at a location within the parking lot 463, access points classified as exits from the parking lot 463 are prioritized.

Once the vehicle goes off-route, the positioning device is no longer tracking segments in the map. The positioning device can store a route by periodically determining the location of the vehicle and plotting the path in the map, also known as a breadcrumb route. In one embodiment, the route 418 is the breadcrumb route from the off-route 420 to a point 402. The point 402 is where the car is parked in the parking lot 463. The positioning device determines that the car is parked when the engine is turned off. The positioning device then enters a pedestrian mode in response to the vehicle being removed from a cradle in the vehicle. The positioning device is configured for pedestrian use when it is in pedestrian mode.

In one embodiment, the search-for-parking routes are open ended and continues to direct the user further and further away from the point 401 in search of parking by selecting segments according to the search-for-parking priorities. In one embodiment, the positioning system displays or periodically announces the current distance from the point 401 so that the user can decide whether to restart the search-for-parking process.

In one embodiment, the user triggers a restart of the search-for-parking process by speaking a command recognized by a voice-recognition system or pressing a button on the positioning device. In another embodiment, a restart is triggered when the distance from the destination exceeds a predetermined threshold. For example, the positioning device may be configured to restart when the user is more than a half mile from the destination.

When a restart is requested in search-for-parking mode, a point-to-point route from the current location of the vehicle to the point 401 is generated and real-time directions are announced to the user to direct the vehicle back to the point 401 where the search-for-parking process is restarted. For example, at a point 404 on the route 411, the a restart may be automatically or manually generated. In response, to the restart request, a route 420 is generated from the point 404 to the point 401 and the user is guided to follow the route 420. When the vehicle arrives at the point 401, the search for parking continues. In some embodiments, the search-for-parking route used in the previous search is used again. In other embodiments, alternative search-for-parking routes may be used. The search-for-parking process may be restarted more than once.

Figure 5:
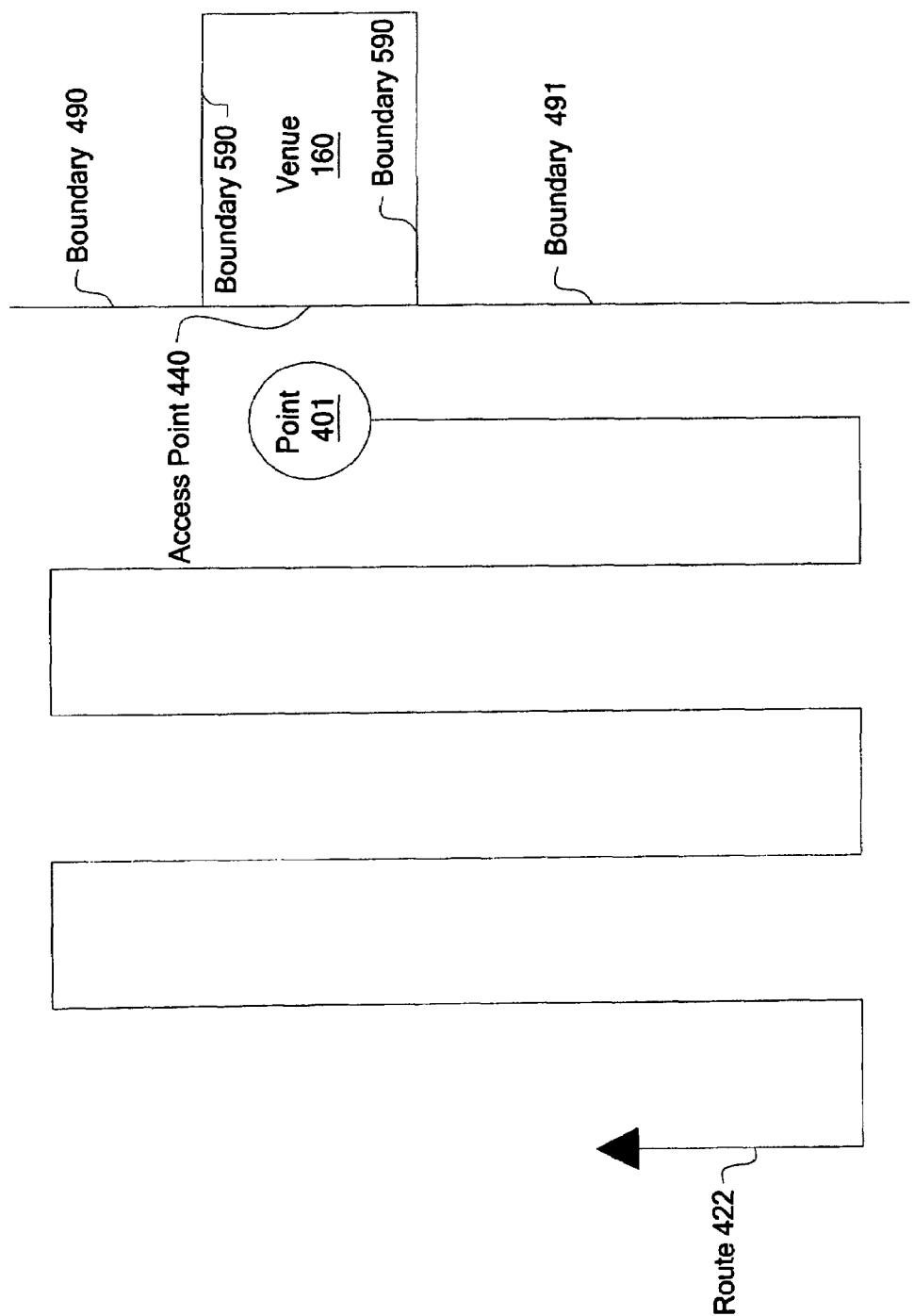
FIG. 5 is a diagrammatic representation of a map with a search for parking using a zig-zag pattern route according to one embodiment of the invention.

FIG. 5 illustrates a diagrammatic representation of a map with a zig-zag pattern according to one embodiment of the present invention.

A user is routed to a point 501 at the access point 540 of a venue 560. A boundary 590 may extend in either direction preventing the use of a spiral pattern, for example, around the venue 560. In other cases, the zig-zag pattern is selected at least in part because the pattern and routing rules of the segments in the vicinity of the venue 560 can be more efficiently used consistent with a zig-zag pattern as compared to other search-for-parking patterns, including the spiral pattern.

A route 521 going back and forth along parallel segments ("zig-zag pattern") is generated to search for parking. The distance routed in one direction before routing to a parallel path in the opposite direction may be determined by many factors, such as the length of the path in the first direction, the location of segments connecting with another parallel path, and a tradeoff between the distance from the destination both along the first direction and the direction perpendicular to the first direction.

Figure 6:
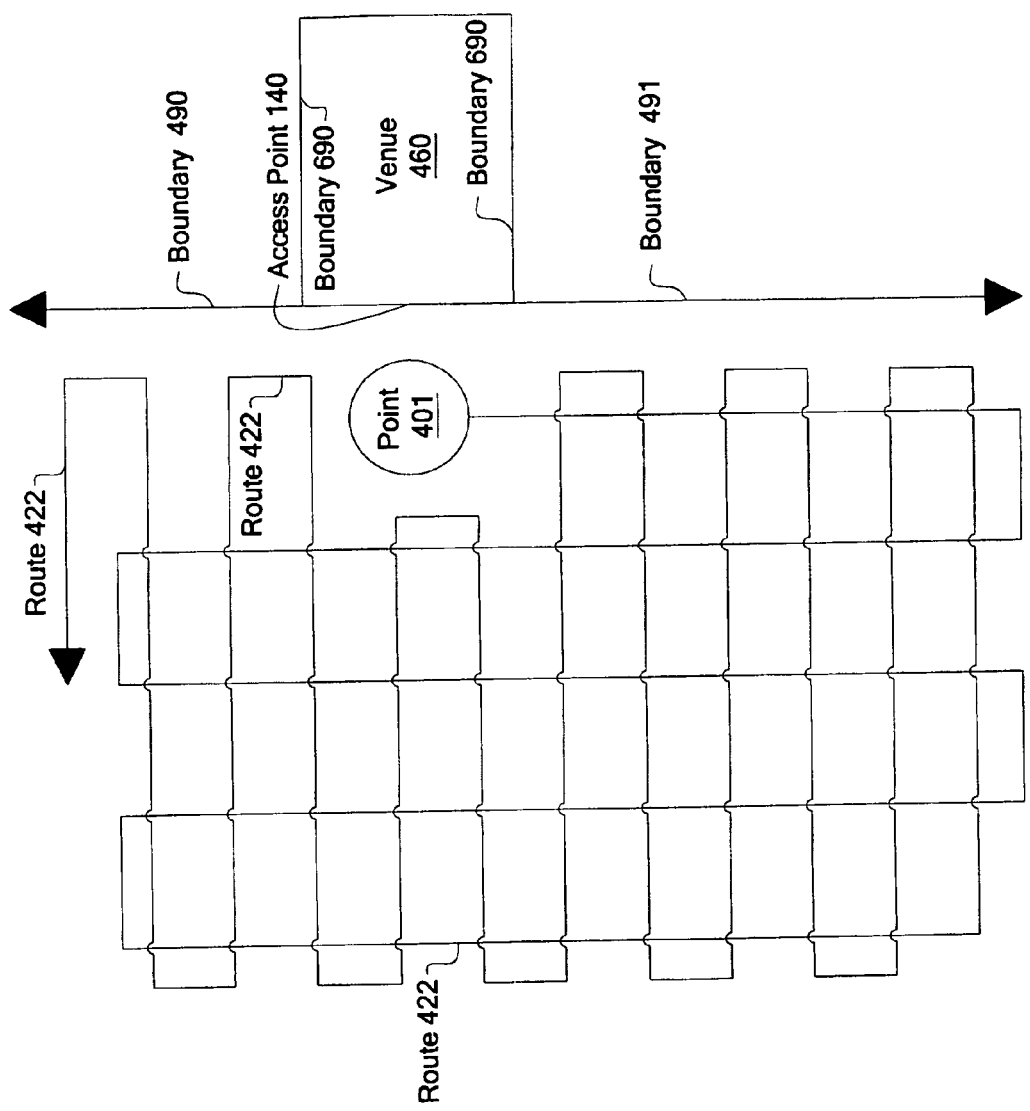
FIG. 6 is a diagrammatic representation of a map with a search for parking using a grid pattern route according to one embodiment of the invention.

FIG. 6 illustrates a diagrammatic representation of a map with a grid pattern according to one embodiment of the present invention.

A user is routed to a point 601 at the access point 640 of a venue 660. A boundary 690 may extend in either direction preventing the use of a spiral pattern, for example, around the venue 660. In other cases, the grid pattern is selected at least in part because the pattern and routing rules of the segments in the vicinity of the venue 660 can be more efficiently used consistent with a grid pattern as compared to other search-for-parking patterns, including the spiral pattern.

A route 622 uses two zig-zag patterns to create a grid pattern to search for parking. A first zig-zag pattern extends to parallel routes in one direction and then a second zig-zag pattern extends to parallel routes perpendicular to the first zig-zag pattern. The distance to extend the first zig-zag pattern before commencing the second zig-zag pattern depends on many factors, such as the availability of parallel routes in the first direction, the availability of parallel routes in the perpendicular direction, and a tradeoff between the distance from the destination both along the first direction and the direction perpendicular to the first direction.

In some cases, the segments of the map do not allow for such regular patterns as the illustrated spiral, zig-zag and grid patterns because of routing restrictions such as one-way streets and turning limitations. In other cases, patterns other than spiral patterns, zig-zag patterns and grid patterns may be used. It will be apparent to one skilled in the art that the priorities identified may be incorporated with other routing rules and priorities to generate any number of search-for-parking routes that are within the spirit and scope of the present invention.

Figure 7:
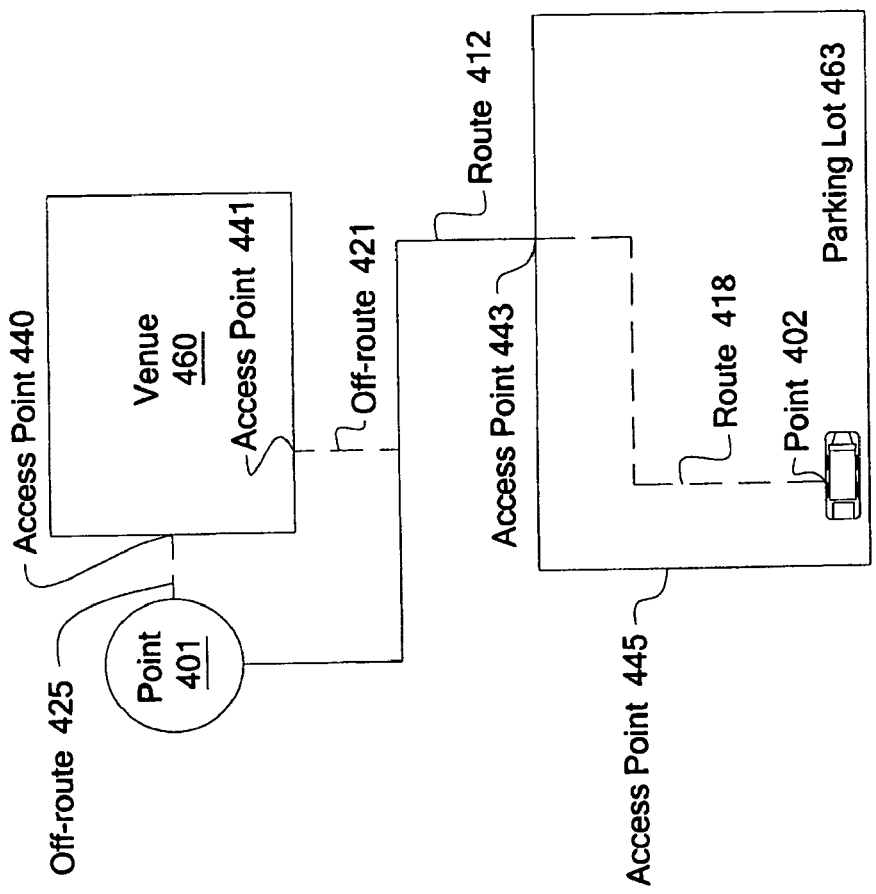
FIG. 7 is a diagrammatic representation of a map with a pedestrian route according to one embodiment of the invention.

FIG. 7 illustrates a diagrammatic representation of a map with a pedestrian route according to one embodiment of the present invention.

When leaving the parked car, the user can request that the positioning device guide the user along the route 418 to return to the access point 443. Guidance can be provided by a visual mapping display, voice-synthesized announcements for real-time directions, or a text based list of directions, for example. Furthermore, the user can request that the positioning device generate a point-to-point route from the point 402 to the point 401 near an access point 440 of the venue 460. Since the positioning device is in the pedestrian mode, the point-to-point route is generated using pedestrian rules. In many cases, the route using pedestrian rules is different than the point-to-point route generated using driving rules. For example, a pedestrian could walk in either direction on the curb alongside a one-way street so use of that segment for routing would be different depending on whether the positioning device is in vehicle mode or pedestrian mode.

A route 412 is generated by point-to-point routing from the access point 443 to the point 401 using pedestrian rules. The user may follow the guidance from the positioning device along the route 412 all the way to the point 401 adjacent to the access point 440 of the venue 460. In one embodiment, the access point 440 corresponds to the street address of the venue 460. In some cases, while following the route 412, the user sees an alternate access point to the venue 460 and decides to use the alternate access point. In this case, the user takes an off-route 421 to enter the venue 460 through an access point 441. The positioning device detects the off-route 421 and stores the access point 441 in the map when the current position diverges from the route 412 near the venue 460. In one embodiment, the positioning device determines the location of the access point 441 more precisely by detecting the reduction in gps signal strength, for example, as the user enters a building corresponding to the venue 460.

The access point 441 can be stored in the map to be used for future routing requests. After the access point 441 is stored in the map, the positioning device can be configured to identify the access point 441 as an alternative destination when point-to-point routing to the venue 460 is requested.

In some cases, the access point may only be an entrance to the venue 460 or it may be both an entrance and an exit to the venue 460. In some embodiments, user input is requested to classify this access point as an entrance only, an exit only, or both and entrance and exit and this information is used for future routing requests. For example, when point-to-point routing is performed to the venue 460, the positioning device prioritizes access points classified as entrances to the venue 460. When point-to-point routing is performed starting at a location within the venue 460, access points classified as exits from the venue 460 are prioritized.

Figure 8:
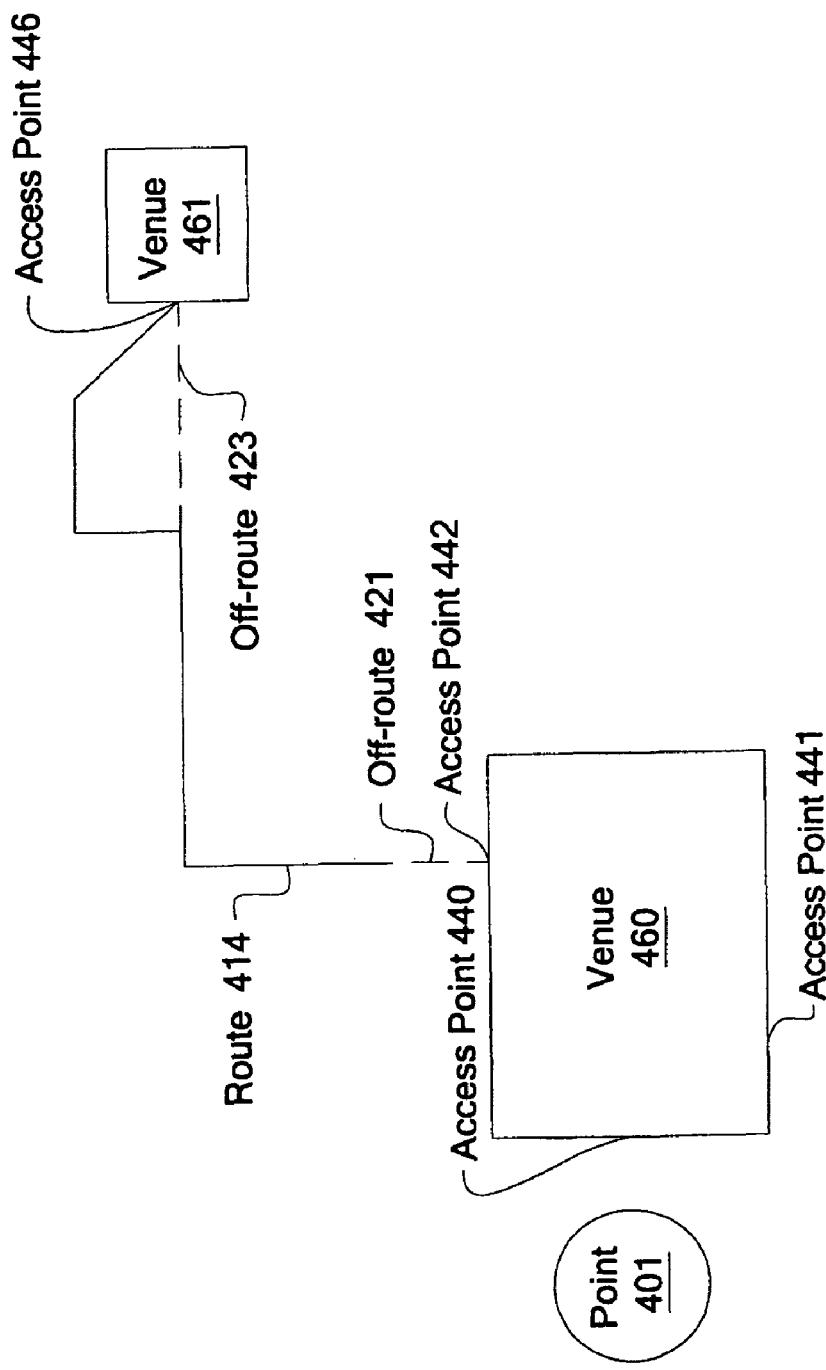
FIG. 8 is a diagrammatic representation of a map with a pedestrian route according to one embodiment of the invention.

FIG. 8 illustrates a diagrammatic representation of a map with a pedestrian route according to one embodiment of the present invention.

After spending some time at the venue 460, the user leaves the venue 460 from an access point 442 to go to lunch, for example. The positioning device determines that the user transitions from an off-route 422 to a segment in the map and stores the current location in the map as an access point 442 to the venue 460. In one embodiment, the positioning device determines the location of the access point 442 more precisely by detecting the increase in gps signal strength, for example, as the user leaves a building corresponding to the venue 460.

In one embodiment, the user selects one of several restaurants meeting criteria provided by the user such as the type of cuisine and distance from the current location. The user selects a restaurant at a venue 461. The positioning device then uses point-to-point routing to generate a route 414 from the access point 441 to the venue 461.

While walking along a route 414, the user decides to diverge from the route 414 and use an off-route 423 to get to an access point 446 of the venue 461. The off-route 423 is not in the map and therefore was not evaluated in generating the route 414. The off-route 423 may be a shortcut. For example, the user may see the venue 461 across an open field, a parking lot or an access point between buildings and decide to take this shortcut. The positioning device can periodically determine the location of the positioning device along the off-route 423 until the user arrives at the venue 461 or the user arrives at a segment on the map and store the off-route 423 as a segment in the map to be used for future routing requests.

In one embodiment, the off-route 423 is only made available for routing requests when the positioning device is in pedestrian mode since the off-route 423 may not be traversable by vehicle. In other embodiments, the off-route 423 may be available in one or more routing modes as indicated by the user. For example, the user because the user can see this route would be traversable by vehicle, the user may opt to have this route added for use in routing requests in vehicle mode.

The positioning device can be configured to use breadcrumb routes and additional access points when subsequent routing requests are made. For example, after lunch the user may request a route back to the venue 460. The positioning device may compute point-to-point routes from the access point 446 to the access point 440, the access point 441 and the access point 442 and automatically select the best route of these three routes based on shortest distance or shortest projected travel time, for example. In one embodiment, the user can select whether to route only to the access point 440 of the venue 460 or make the alternative access points available for point-to-point routing. In one embodiment, the user can select whether to make the off-route 423 (and other breadcrumb routes) available for point-to-point routing.

Figure 9:
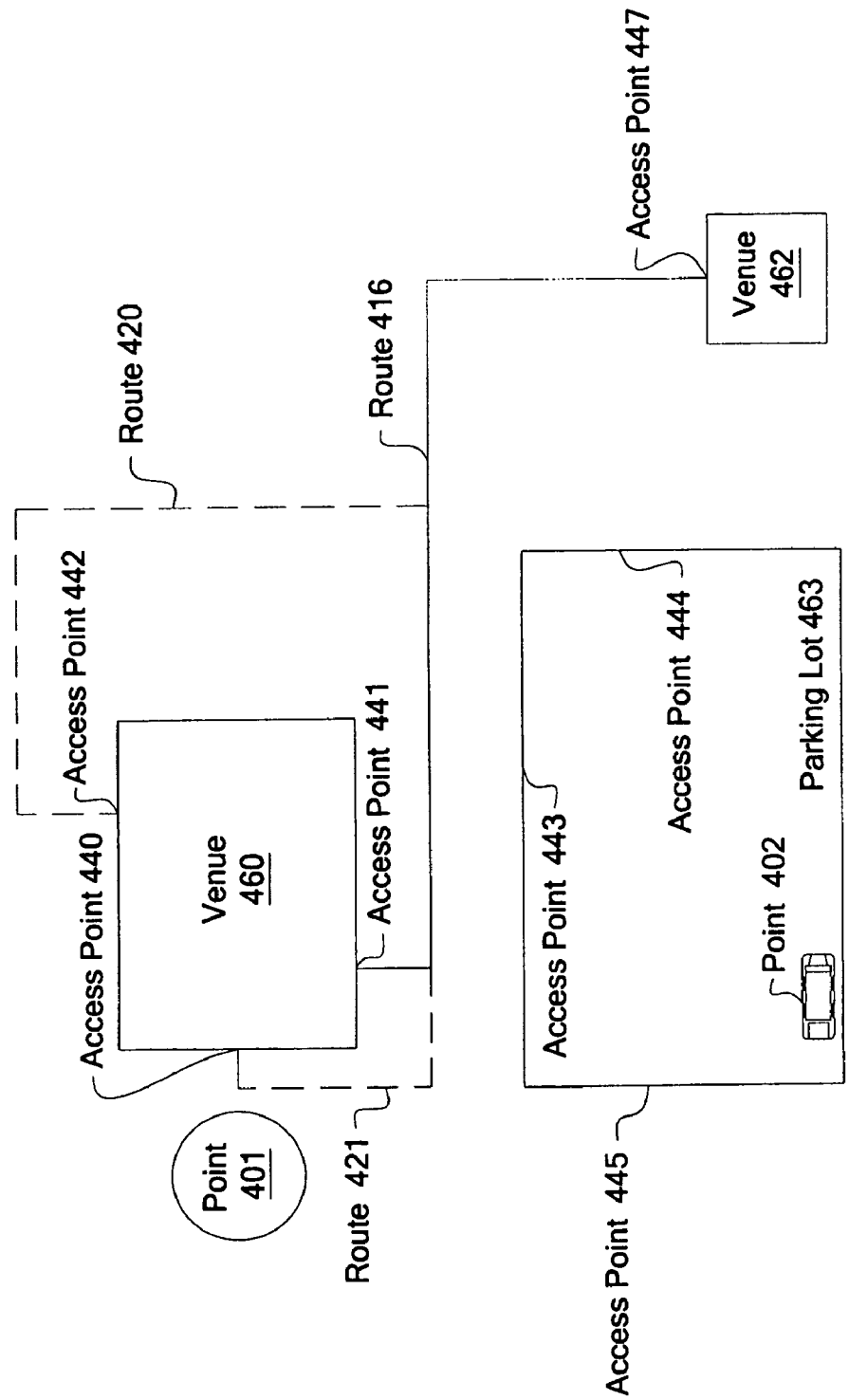
FIG. 9 is a diagrammatic representation of a map with a pedestrian route according to one embodiment of the invention.

FIG. 9 illustrates a diagrammatic representation of a map with a pedestrian route according to one embodiment of the present invention.

At dinnertime, the user from within the venue 460 selects restaurant at a venue 462 to have dinner. In one embodiment, the user simply enters a destination address. Other methods of generating a list of alternative destinations and selecting among them may be used. The address is associated with an access point 447 of the venue 462. In one embodiment, the positioning device generates point-to-point routing from each of the access points of the venue 460 to the access point 447 and selects the best route. For example, a route 415 is generated from the access point 441, a route 421 is generated from the access point 440 (overlapping a portion of the route 415 to the access point 447) and a route 420 is generated from the access point 442 (overlapping a portion of the route 415 to the access point 447). A best route is selected based on a criteria such as the shortest distance or the shortest expected travel time. The user is then directed to exit the venue 460 from the access point associated with the best route. For example, the user may be directed to exit from the access point 441 and follow the route 415 to the access point 447 of the venue 462.

Figure 10:
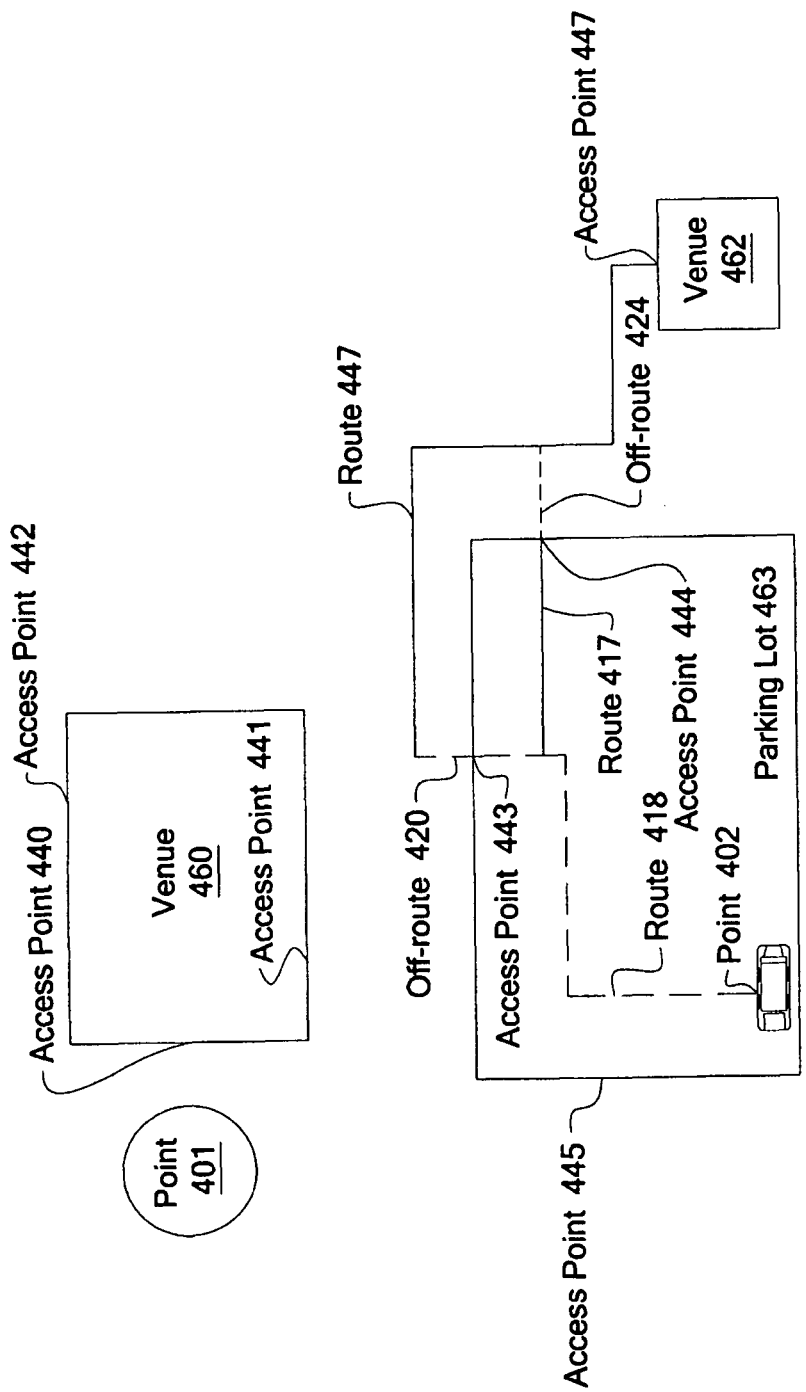
FIG. 10 is a diagrammatic representation of a map with a pedestrian route according to one embodiment of the invention.

FIG. 10 illustrates a diagrammatic representation of a map with a pedestrian route according to one embodiment of the present invention.

When the user is done with dinner, the user can request that the positioning device generate a route back to the vehicle at the point 402, the venue 460 or any other location in the map. In this case, the user requests a route back to the vehicle in the parking lot 463. When the only access point to the parking lot 463 currently stored in the map is the first lot access point 443, the point-to-point routing generates a route 416 from the access point 447 to the access point 443. The route 418 is used to route from the access point 447 to the vehicle at the point 402. However, as the user is walking along the route 416, the user sees an alternative entrance to the parking lot 463 and diverges from the route 416 onto an off-route 424 to enter the parking lot 463 at an access point 444. The positioning device then generates a straight-line route from the access point 444 to the closest point on the route 418 or the point 402, whichever is closer. In this case, a route 417 is generated which intercepts the route 418 at the closest point to the access point 444. The user then can follow the route 417 to the route 418 and follow the route 418 to the parked vehicle at the point 402.

The user then mounts the positioning device in a cradle in the vehicle and starts the car. In one embodiment, the positioning device may switch from pedestrian mode to vehicle mode automatically when the positioning device is put into the cradle in the vehicle. In another embodiment, the positioning system may switch from pedestrian mode to vehicle mode automatically when the vehicle engine is turned on. In some embodiments, the user may cause the positioning device to switch from pedestrian mode to vehicle mode by speaking a command recognized by a voice-recognition system or pressing a button on the positioning device.

Figure 11:
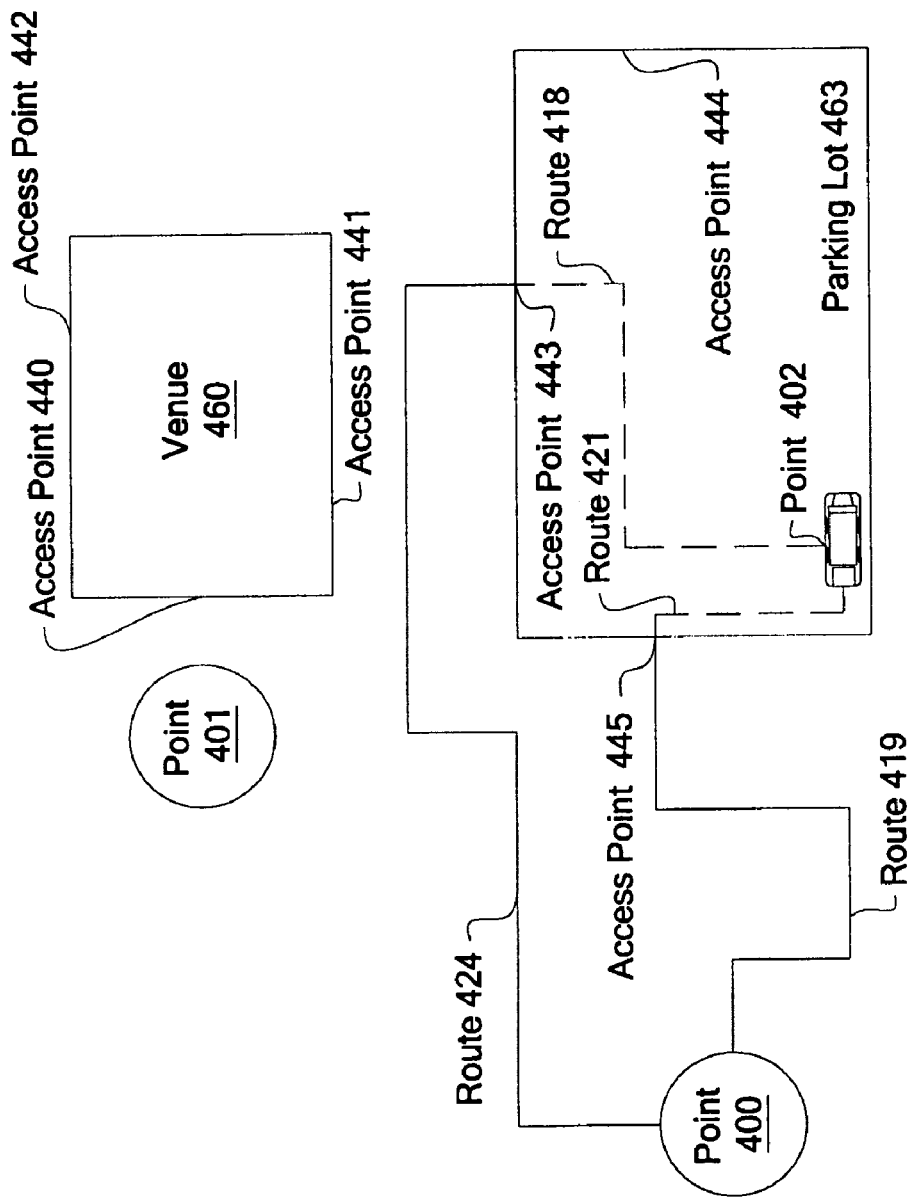
FIG. 11 is a diagrammatic representation of a map with a vehicle route according to one embodiment of the invention.

FIG. 11 illustrates a diagrammatic representation of a map with a vehicle route according to one embodiment of the present invention.

After starting the vehicle at the point 402, the user may request that the positioning device generate point-to-point routing from the point 402 to a particular destination, such as the point 400. Before an access point 445 is detected, the positioning device may generate a route along the route 418 to exit the parking lot 463 at the access point 443 and continue along a route 424 from the access point 443 to the point 400.

But in some cases, the user drives the vehicle out of another access point of the parking lot 463. For example, the user may see a closer exit or the signs in the parking lot 463 may direct the user to exit through a different access point than the first lot access point 443. In the illustrated case, the user drives the vehicle along a route 425 and exits the parking lot 463 through the access point 445. The access point 445 is recorded for subsequent routing requests. In one embodiment, when the positioning device detects that the location transitions from off-route to a segment on the map, the positioning device determines that the user has left an alternative exit of the parking lot 463 and generates a route 419. The route 419 is a point-to-point route from the access point 445 to the point 400.

In this case, since the positioning device is in vehicle mode while this access point is first used, the access point 445 may only be made available for routing requests while the positioning device is in vehicle mode. Furthermore, since the access point was used as an exit from the parking lot 463, this access point may only be made available for routing requests as an exit. In some embodiments, user-input is requested to classify the access point 445 as an entrance, an exit or both an entrance and an exit.

Figure 12:
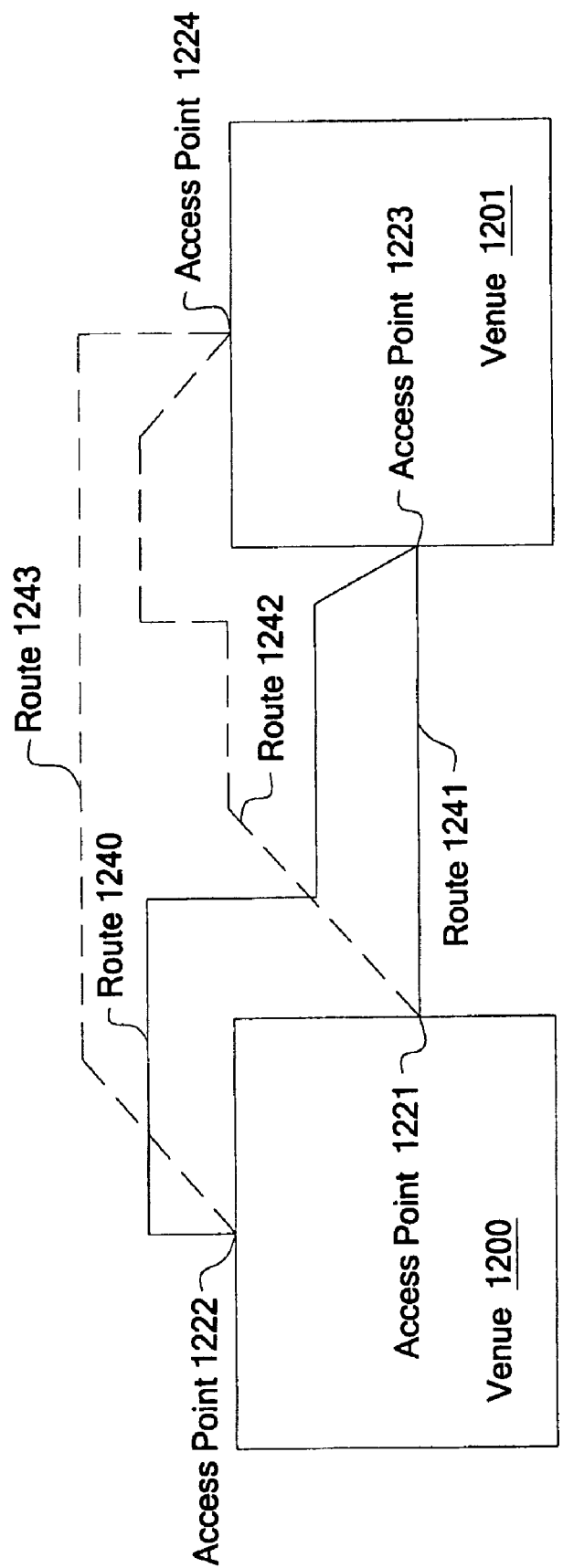
FIG. 12 is a diagrammatic representation of a map with alternative routes according to one embodiment of the invention.

FIG. 12 illustrates a diagrammatic representation of a map with alternative routes according to one embodiment of the present invention.

In one embodiment, a routing request is made from a venue 1200 to a venue 1201. The venue 1200 has an access point 1221 and an access point 1222. In one embodiment the access point 1221 is the primary access point associated with the venue 1200 in the map and the access point 1222 is an additional access point detected and stored in the map according to a method of the present invention. The venue 1201 has an access point 1223 and an access point 1224. In one embodiment the access point 1223 is the primary access point associated with the venue 1201 in the map and the access point 1222 is an additional access point detected and stored in the map according to a method of the present invention.

In response to the routing request, four routes are generated: a route 1240 from the access point 1222 to the access point 1223, a route 1240 from the access point 1222 to the access point 1223, a route 1240 from the access point 1222 to the access point 1223, and a route 1240 from the access point 1222 to the access point 1223

Figure 13:
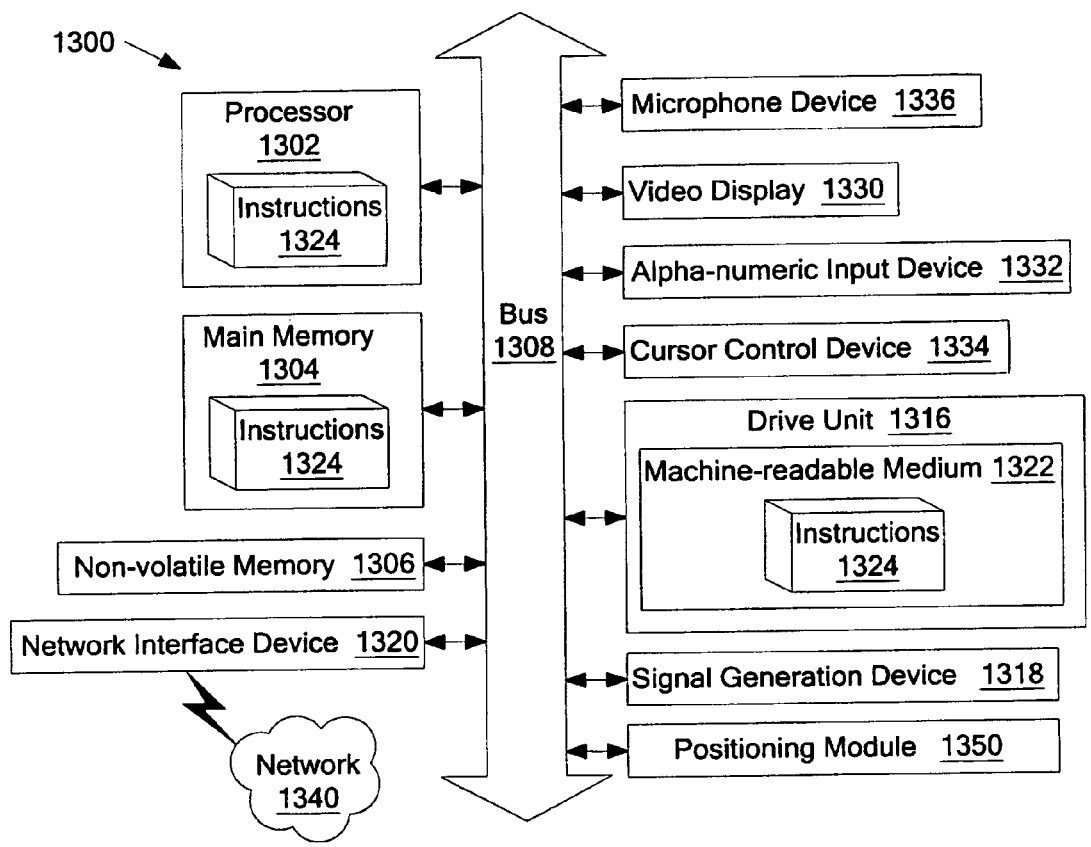
FIG. 13 is a diagrammatic representation of a machine in the exemplary form of a computer system.

FIG. 13 shows a diagrammatic representation of an embodiment of a machine 1300 within which a set of instructions, for causing the machine to perform any one or more of the methodologies discussed herein, may be executed. The machine may be connected (e.g., networked) to other machines. In a networked deployment, the machine may operate in the capacity of a server or a client machine in a client-server network environment, or as a peer machine in a peer-to-peer (or distributed) network environment. In one embodiment, the machine communicates with the server to facilitate operations of the server and/or to access the operations of the server.

The machine 1300 includes a processor 1302 (e.g., a central processing unit (CPU) a graphics processing unit (GPU) or both), a main memory 1304 and a nonvolatile memory 1306, which communicate with each other via a bus 1308. In some embodiments, the machine 1300 may be a handheld positioning device, a laptop computer, personal digital assistant (PDA) or mobile phone, for example. In one embodiment, the machine 1300 also includes a positioning module 1350, a video display 1330, an alphanumeric input device 1332 (e.g., a keyboard), a cursor control device 1334 (e.g., a mouse), a microphone 1336, a disk drive unit 1316, a signal generation device 1318 (e.g., a speaker) and a network interface device 1320.

In one embodiment, the positioning module 1350 interfaces with an external system to enable positioning capability. For example, the positioning module may interface with a global positioning system, long-range navigation systems, or systems which use transmissions from known locations to determine the position by triangulation.

In one embodiment, the video display 1330 includes a touch sensitive screen for user input. In one embodiment, the touch sensitive screen is used instead of a keyboard and mouse. The disk drive unit 1316 includes a machine-readable medium 1322 on which is stored one or more sets of instructions (e.g., software 1324) embodying any one or more of the methodologies or functions described herein. The software 1324 may also reside, completely or at least partially, within the main memory 1304 and/or within the processor 502 during execution thereof by the computer system 1300, the main memory 1304 and the processor 1302 also constituting machine-readable media. The software 1324 may further be transmitted or received over a network 1340 via the network interface device 1320.

While the machine-readable medium 1322 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

In general, the routines executed to implement the embodiments of the disclosure, may be implemented as part of an operating system or a specific application, component, program, object, module or sequence of instructions referred to as "programs." For example, one or more programs may be used to execute specific processes described herein. The programs typically comprise one or more instructions set at various times in various memory and storage devices in the machine, and that, when read and executed by one or more processors, cause the machine to perform operations to execute elements involving the various aspects of the disclosure.

Moreover, while embodiments have been described in the context of fully functioning positioning devices, those skilled in the art will appreciate that the various embodiments are capable of being distributed as a program product in a variety of forms, and that the disclosure applies equally regardless of the particular type of machine or computer-readable media used to actually effect the distribution. Examples of machine-readable media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Although embodiments have been described with reference to specific exemplary embodiments, it will be evident that the various modification and changes can be made to these embodiments. Accordingly, the specification and drawings are to be regarded in an illustrative sense rather than in a restrictive sense. The foregoing specification provides a description with reference to specific exemplary embodiments. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method for providing guidance with a positioning device comprising:
   identifying a first venue;
   identifying a plurality of second access points at a second venue;
   determining the positioning device is near the second venue;
   detecting the positioning device is off-route at an off-route location;
   storing the off-route location as a first access point associated with the first venue on the map;
   periodically determining location of the positioning device from the off-route location until the positioning device switches an operation mode;
   providing guidance back to the first access point after the positioning device switches the operation mode;
   generating a set of alternative routes by performing point-to-point routing from the first access point to the plurality of second access points;
   selecting a best route among the set of alternative routes according to a predetermined criterion; and
   using the positioning device to provide guidance from the first venue to the second venue along the best route.

2. The method of claim 1 further comprising adding another first access point previously not indicated on the map to the first venue after a user accessing the first venue through the another first access point.

3. The method of claim 1 wherein the first venue is a building, a building complex, and/or a parking lot.

4. The method of claim 1 wherein the predetermined criterion is selecting a route having a shortest length between the first access point and the second venue.

5. The method of claim 1 wherein predetermined criterion is selecting a route having a shortest projected travel time between the first access point and the second venue.

6. The method of claim 1 further comprising determining whether to enable or disable a shortcut segment for routing.

7. The method of claim 6 wherein determining whether to enable or disable the shortcut segment for routing is making the shortcut segment available for generation of all routes, generation of routes in pedestrian mode and/or generation of routes in vehicle mode.

8. The method of claim 1 wherein the first access point is an exit of the first venue, the second access points are entrances of the second venue.

9. A positioning device using a map having a plurality of segments, the positioning device comprising a program for performing the method of claim 1.

10. A machine-readable medium that provides instructions for a processor, which when executed by the processor causes the processor to perform the method of claim 1.

* * * * *